US007069235B1

(12) United States Patent
Postelnik et al.

(10) Patent No.: US 7,069,235 B1
(45) Date of Patent: Jun. 27, 2006

(54) SYSTEM AND METHOD FOR MULTI-SOURCE TRANSACTION PROCESSING

(75) Inventors: Igor Postelnik, Austin, TX (US); Jocelyn E. Goldfein, Austin, TX (US); Phil G. Gilbert, Austin, TX (US)

(73) Assignee: pcOrder.com, Inc., Austin, TX (US)

( * ) Notice: Subject to any disclaimer, the term of this patent is extended or adjusted under 35 U.S.C. 154(b) by 0 days.

(21) Appl. No.: 09/518,766

(22) Filed: Mar. 3, 2000

(51) Int. Cl.
*G06Q 30/00* (2006.01)

(52) U.S. Cl. ....................................................... 705/26
(58) Field of Classification Search .................. 705/26, 705/27, 28
See application file for complete search history.

(56) References Cited

U.S. PATENT DOCUMENTS

| | | | | |
|---|---|---|---|---|
| 4,799,156 | A | | 1/1989 | Shavit et al. ............... 364/401 |
| 4,992,940 | A | | 2/1991 | Dworkin ...................... 364/401 |
| 5,193,056 | A | | 3/1993 | Boes ........................... 364/408 |
| 5,361,199 | A | * | 11/1994 | Shoquist et al. .............. 705/26 |
| 5,515,524 | A | | 5/1996 | Lynch et al. ................. 395/500 |
| 5,694,551 | A | * | 12/1997 | Doyle et al. ................... 705/26 |
| 5,708,798 | A | | 1/1998 | Lynch et al. ................. 395/500 |
| 5,710,887 | A | | 1/1998 | Chelliah et al. ............. 395/226 |

(Continued)

FOREIGN PATENT DOCUMENTS

| | | |
|---|---|---|
| WO | WO 93/24892 | 12/1993 |
| WO | WO 98/19259 | 5/1998 |
| WO | WO 2003075196 * | 9/2001 |

OTHER PUBLICATIONS

"pcOrder's Solutions: Software, Content and Community", http://corporate.pcorder.com/solutions/, Feb. 17, 2000, 1 page.

(Continued)

*Primary Examiner*—Jeffrey A. Smith
(74) *Attorney, Agent, or Firm*—Hamilton & Terrile, LLP; Kent B. Chambers

(57) ABSTRACT

A system and method for multi-source transaction processing receives order requests from a client system operated by a user. The order requests may include order placements and order inquiries. For example, an order request may be a placement for a computer system and associated peripherals. The user may have particular fulfillment organization preferences, and different components of the computer system and associated peripherals may be fulfilled by different fulfillment partners. Accordingly, the orders order requests are processed by an order request servicing system to, for example, split the order request into multiple processed order requests and each of the processed order requests is associated with an order request management system and prepared for transmission to the associated order request management system. The order request management systems can utilize the processed order requests to fulfill the order request. The order request management systems transmit order request management system data which provides, for example, order status information, financial information, and other data. The order request servicing system may, for example, internally process the order request management system data associated with an order request, transmit the order request management system data to the client system, or transmit the order request management system data to another system depending upon the nature of the order request management system data. Thus, the order request servicing system can transparently link users to one or more order request management systems. Additionally, the order request management systems can be linked together over a network, such as the Internet, to provide a network of order request management systems.

27 Claims, 9 Drawing Sheets

U.S. PATENT DOCUMENTS

| | | | |
|---|---|---|---|
| 5,732,400 A | 3/1998 | Mandler et al. | 705/26 |
| 5,734,150 A | 3/1998 | Brown et al. | 235/381 |
| 5,742,931 A | 4/1998 | Spiegelhoff et al. | 705/8 |
| 5,745,681 A | 4/1998 | Levine et al. | 395/200.3 |
| 5,749,785 A | 5/1998 | Rossides | 463/25 |
| 5,758,328 A | 5/1998 | Giovannoli | 705/26 |
| 5,825,651 A | 10/1998 | Gupta et al. | 364/468.09 |
| 5,842,178 A | 11/1998 | Giovannoli | 705/26 |
| 5,842,218 A | 11/1998 | Robinson | 707/102 |
| 5,844,554 A | 12/1998 | Geller et al. | 345/744 |
| 5,852,809 A | 12/1998 | Abel et al. | 705/26 |
| 5,878,400 A | 3/1999 | Carter, III | 705/20 |
| 5,893,076 A | 4/1999 | Hafner et al. | 705/28 |
| 5,895,454 A | 4/1999 | Harrington | 705/26 |
| 5,895,468 A | 4/1999 | Whitmer, Jr. | 707/10 |
| 5,918,214 A | 6/1999 | Perkowski | 705/27 |
| 5,924,082 A | 7/1999 | Silverman et al. | 75/37 |
| 5,926,817 A | 7/1999 | Christeson et al. | 707/10 |
| 5,930,779 A | 7/1999 | Knoblock et al. | 705/412 |
| 5,937,390 A | 8/1999 | Hyodo | 705/14 |
| 5,940,807 A | 8/1999 | Purcell | 705/26 |
| 5,950,177 A | 9/1999 | Lupien et al. | 705/37 |
| 5,960,411 A | 9/1999 | Hartman et al. | 705/26 |
| 5,963,915 A | 10/1999 | Kirsch | 709/203 |
| 5,970,470 A | 10/1999 | Walker et al. | 705/14 |
| 5,970,472 A | 10/1999 | Allsop et al. | 705/26 |
| 5,970,475 A | 10/1999 | Barnes et al. | 705/27 |
| 5,974,406 A | 10/1999 | Bisdikian et al. | 707/1 |
| 5,978,776 A | 11/1999 | Seretti et al. | 705/26 |
| 5,978,785 A | 11/1999 | Johnson et al. | 706/54 |
| 5,987,423 A | 11/1999 | Arnold et al. | 705/14 |
| 5,991,739 A | 11/1999 | Cupps et al. | 705/26 |
| 6,002,854 A | 12/1999 | Lynch et al. | 395/500.01 |
| 6,014,644 A | 1/2000 | Erickson | 705/37 |
| 6,016,504 A | 1/2000 | Arnold et al. | 709/200 |
| 6,029,141 A | 2/2000 | Bezos et al. | 705/27 |
| 6,047,264 A | 4/2000 | Fisher et al. | 705/26 |
| 6,061,057 A | 5/2000 | Knowlton et al. | 345/744 |
| 6,119,101 A | 9/2000 | Peckover | 705/26 |
| 6,125,352 A | 9/2000 | Franklin et al. | 705/26 |
| 6,131,087 A | 10/2000 | Luke et al. | 705/26 |
| 6,134,548 A | 10/2000 | Gottsman et al. | 707/5 |
| 6,141,006 A | 10/2000 | Knowlton et al. | 705/26 |
| 6,141,653 A | 10/2000 | Conklin et al. | 705/80 |
| 6,151,588 A | 11/2000 | Tozzoli et al. | 705/37 |
| 6,167,378 A * | 12/2000 | Webber, Jr. | 705/8 |
| 6,167,383 A | 12/2000 | Henson | 705/26 |
| 6,236,972 B1 | 5/2001 | Shkedy | 705/1 |
| 6,260,024 B1 | 7/2001 | Shkedy | 705/37 |
| 6,282,517 B1 | 8/2001 | Wolfe et al. | 705/26 |
| 6,282,550 B1 * | 8/2001 | Venkatesan et al. | 707/104.1 |
| 6,295,513 B1 | 9/2001 | Thackston | 703/1 |
| 6,317,722 B1 | 11/2001 | Jacobi et al. | 705/14 |
| 6,332,135 B1 | 12/2001 | Conklin et al. | 705/80 |
| 6,338,050 B1 | 1/2002 | Conklin et al. | 705/80 |
| 6,339,763 B1 | 1/2002 | Divine et al. | 705/27 |
| 6,351,738 B1 * | 2/2002 | Clark | 705/37 |
| 6,370,653 B1 | 4/2002 | Ichinohe et al. | 709/223 |
| 6,405,174 B1 | 6/2002 | Walker et al. | 705/26 |
| 6,405,176 B1 | 6/2002 | Toohey | 705/26 |
| 6,405,308 B1 | 6/2002 | Gupta et al. | 713/1 |
| 6,442,528 B1 * | 8/2002 | Notani et al. | 705/9 |
| 6,553,350 B1 | 4/2003 | Carter | 705/20 |
| 6,574,608 B1 | 6/2003 | Dahod et al. | 705/26 |
| 6,587,827 B1 * | 7/2003 | Hennig et al. | 705/1 |
| 6,598,026 B1 | 7/2003 | Ojha et al. | 705/26 |
| 6,604,093 B1 | 8/2003 | Etzion et al. | 706/47 |
| 6,606,603 B1 * | 8/2003 | Joseph et al. | 705/26 |
| 6,631,365 B1 | 10/2003 | Neal et al. | 707/2 |
| 6,651,217 B1 | 11/2003 | Kennedy et al. | 715/507 |
| 6,671,716 B1 | 12/2003 | Diedrichsen et al. | 709/203 |
| 6,675,294 B1 | 1/2004 | Gupta et al. | 713/1 |
| 2001/0011222 A1 | 8/2001 | McLauchlin et al. | 705/1 |
| 2002/0013731 A1 * | 1/2002 | Bright et al. | 705/22 |
| 2003/0144852 A1 * | 7/2003 | Eckert et al. | 705/1 |

OTHER PUBLICATIONS

"pcOrder: Technology Overview", http://corporate.pcorder.com/technology/, Feb. 17, 2000, 1 page.

"pcOrder: Products", http://corporate.pcorder.com/products/, Feb. 17, 2000, 1 page.

"pcOrder: Products/eStation", http://corporate.pcorder.com/products/estation/estation.pdf, Feb. 17, 2000, 14 pages.

"pcOrder: Products/eStation/Features", http://corporate.pcorder.com/products/estation/features.asp, Feb. 17, 2000, 1 page.

"pcOrder: Products/eStation/Benefits", http://corporate.pcorder.com/products/estation/benefits.asp, Feb. 17, 2000, 2 pages.

Fixmer, Andrew H., "Let's Make A Deal," Now on the Web; New York Times; Late Editions, East Coast; New York; Dec. 24, 1999, p. F.1, extracted on Internet from http://proquest.umi.com on Jan. 17, 2004.

Jastrow, David, "PcOrder connects buyers and sellers", Computer Reseller News, Nov. 15, 1999, Iss. 869, p. 48.

Information on Alibaba-Inc.Com, 1999-2000.

* cited by examiner

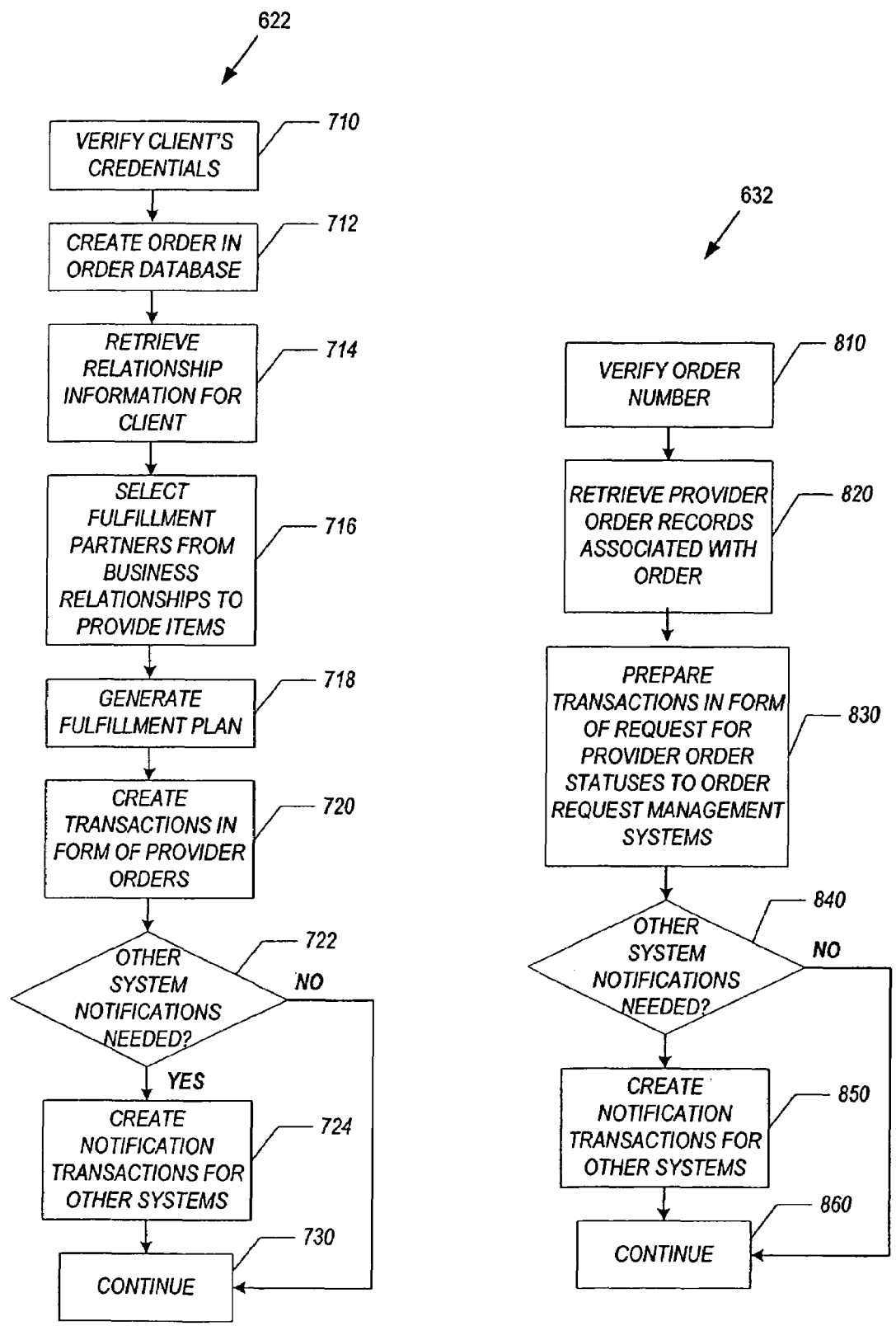

SYSTEM AND METHOD FOR MULTI-SOURCE TRANSACTION PROCESSING

CROSS-REFERENCE TO RELATED APPLICATIONS

This application relates to application Ser. No. 09/519,049, filed on Mar. 3, 2000, entitled "Rules-Based Order Server System and Method" and naming Igor Postelnik, Jocelyn E. Goldfein, and Phil G. Gilbert as inventors, the application being incorporated herein by reference in its entirety.

BACKGROUND OF THE INVENTION

1. Field of the Invention

This invention relates generally to a multi-source order request servicing system and more particularly relates to a system and method for receiving, servicing, and fulfilling order requests which supports at least one order request management system sources. The multi-source order request servicing system obtains and provides a response to each order request by integrating information from one or more sources.

2. Description of the Related Art

In the stream of commerce, numerous commercial transactions occur between multiple parties to enable a manufacturer to provide an item to a customer. Historically many, if not all, of these commercial transactions were insular and discreet, with respect to the other commercial transactions in the stream of commerce. Each involved business traditions and customs uniquely tailored for the commercial transaction at hand. These traditions and customs between merchants in the ordinary course of business evolved over centuries of dealing. As a result, the traditions and customs for any given commercial transaction often differ markedly from those associated with other commercial transactions. So pervasive were these traditions and customs that the first successful attempt to bring uniformity to commercial transactions did not occur until the 1950s, with the creation of the Uniform Commercial Code. To this day, however, the Uniform Commercial Code has not been adopted by every state in the Union. Uniformity in commercial transactions is lacking.

The advent of the Internet has intensified the need to bring uniformity with respect to certain aspects of commercial transactions. The Internet typically includes a plurality of users employing client terminals to order request information from a remote server computer. The remote server computer may then collect information from a variety of other computer systems to fulfill the user's order request, and presents the information to the user. To facilitate the transfer, the client terminals have a web browser that presents a web page containing information obtained from a server, and web servers store information using a standard protocol. One popular collection of servers uses a standardized Hypertext Transfer Protocol (HTTP) to provide information and is known as the "World Wide Web."

The information is typically presented as web pages written as text with standardized formatting and control symbols known as Hypertext Mark-up Language (HTML). HTML provides basic document formatting and allows a server to specify "links" to other servers and files. Use of an HTML-compliant browser involves specification of a link via a Uniform Resource Locator (URL). Upon such specification, the user's client terminal makes a TCP/IP order request to the server identified in the link and receives an HTML file that is interpreted by the browser. An electronic HTML document made up of one or more web pages may be displayed on the client's terminal.

A drawback with the available technology employed to take advantage of the Internet concerns the diversity of computing systems involved in any given commercial transaction. Commercial transactions do not have a standard protocol which every computer system involved in a commercial transaction can understand. Ensuring compatibility between the various computer systems of the parties involved in the commercial transaction has proven daunting. The compatibility problem is exacerbated when attempting to perform commercial transactions involving the myriad of contractual rights and obligations that may exist between the parties.

A merchant, such as a merchant using the Internet to sell its goods and services, faces substantial challenges in obtaining information from the various parties involved in a commercial transaction. For instance, the merchant may not be the manufacturer of the goods it sells, and fulfilling orders for goods may involve complex supply and distribution chains including many other business partners ("suppliers"). Furthermore, the merchant may purchase goods or services from a supplier that does not directly supply the goods or services, but that is an intermediary business having its own supply and distribution chain. Information from all businesses in the supply chain involved in fulfilling an order would enable the merchant to provide complete, timely, and accurate responses to order requests from customers.

Accurate order information is likely stored in the suppliers' "order request management systems", which are order request management systems that deal with managing orders for goods and services. Each supplier's order request management system in a supply chain is a potential source of order information. However, these order request management systems may be incompatible with the order request management system used by the merchant. The merchant desires access to timely and accurate order information from its suppliers' order request management systems. What is needed is a multi-source order request servicing system that allows the merchant's systems to integrate information from other parties' order request management systems to obtain complete, timely, and accurate information. An "order request servicing system" is a type of multi-source order request servicing system that deals with integrating information about orders from multiple sources in the supply chain, including suppliers' order request management systems.

A merchant may also prefer that its complex supply and distribution chain be invisible to its customers, so that the merchant appears to be directly selling to its customers using a "virtual direct sales model." To use a virtual direct sales model, the merchant desires timely and accurate information from the multiple sources in all levels of the supply chain. The multiple sources in all levels of the supply chain include the order request management systems of the lower-level suppliers that supply goods or services to an upper-level supplier or reseller in a multi-level supply chain.

In a virtual direct sales model, the merchant integrates the order status information from multiple sources in the supply chain to present a complete response to an order from its customers. With accurate and timely integrated information, the merchant can serve as the single point of contact with its customers, hiding the fact that the merchant uses a complex supply chain to fulfill customer orders.

Most order request management systems do not address the problems of dealing with a complex chain of suppliers and do not provide the capability to transmit and receive information from a variety of supplier computer systems even in a single-level supply chain. Support for obtaining information from suppliers in a multi-level supply chain is not generally available. Existing order request management systems do not provide complete, timely, and accurate information needed to enable a virtual direct sales model.

In addition, most order request management systems are custom-written or modified to deal with the commercial transactions and business relationships of a particular business. These systems are usually not capable of managing orders for more than one business. In particular, these order request management systems are usually not capable of respecting the business relationships of each of a plurality of businesses sharing an order request servicing system. Sharing multi-source order request servicing systems such as an order request servicing system is especially desirable in the Internet environment, where merchants may not have or wish to expend the resources to develop their own multi-source order request servicing systems.

What is needed is a multi-source order request servicing system that allows the merchant's systems to communicate with multiple sources, including other parties' order request management systems. The multi-source information integration and routing system to integrates complete, timely, and accurate information from the multiple sources in response to a order request such as an order from a customer. The multi-source order request servicing system should be capable of managing order requests involving multiple businesses in a complex supply chain, while respecting the business relationships of each business within the supply chain. Furthermore, the order request servicing system should be flexible enough to be used by an intermediary information integrating organization to integrate information for more than one merchant. The multi-source order request servicing system should enable a merchant to use a virtual direct sales model to its customers. Finally, the multi-source order request servicing system should be capable of being chained to other multi-source order request servicing systems to enable direct access to all suppliers' order request management systems in a multi-level supply chain.

SUMMARY OF THE INVENTION

One embodiment of the present invention includes a transaction processing method utilizing an order request servicing system for routing order requests to multiple order request management systems ("ORMSs") of fulfillment partners and integrating respective ORMS data from ORMSs of each fulfillment partner. The method includes receiving an order request, processing the order request into multiple processed order requests, and selecting fulfillment partners for each of the processed order requests. For each of the processed order requests, transmitting the processed order request to the ORMS of the selected fulfillment partner. The method further includes receiving from each of the ORMSs of the selected fulfillment partners ORMS data associated with the processed order request transmitted to the ORMS of the fulfillment partners and integrating the received ORMS data from the ORMSs of the fulfillment partners.

Another embodiment of the present invention includes an order servicing organization system for routing order requests to multiple order request management systems ("ORMSs") of fulfillment partners and integrating respective ORMS data from ORMSs of each fulfillment partner. The order servicing organization system includes a first order request servicing system having an interface to receive an order request, having a memory to store business relationship information relating a client and the fulfillment parties, and having a processing engine to:

process the order request into multiple processed order requests;

select fulfillment partners for each of the processed order requests using the business relationship information;

for each of the processed order requests, transmit the processed order request to the ORMS of the selected fulfillment partner;

receive from each of the ORMSs of the selected fulfillment partners ORMS data associated with the processed order request transmitted to the ORMS of the fulfillment partners; and integrate the received ORMS data from the ORMSs of the fulfillment partners.

BRIEF DESCRIPTION OF THE DRAWINGS

Features appearing in multiple figures with the same reference numeral are the same unless otherwise indicated.

FIG. 7 shows a flowchart of the Analyze Order step of FIG. 6.

FIG. 8 shows a flowchart of the Analyze Order Request/Response for Order Status step of FIG. 6.

DETAILED DESCRIPTION

The following description of the invention is intended to be illustrative only and not limiting.

An information integrating network enables members of the network to share integrated information of interest to several parties involved in business relationships. An example of an information integrating network is a transaction processing system having an order requests servicing network, which enables parties involved in the supply chain for an order to share information about the order. One skilled in the art will recognize that the system and method described for servicing orders can be used for servicing other types of order requests. Note that any references to "transactions" transmitted to an order request management systems may also be referred to as a processed order request.

Note also that any references to "transactions" from an order request management system may also be referred to as processed order request management system data or order request management system data.

Figure 1:
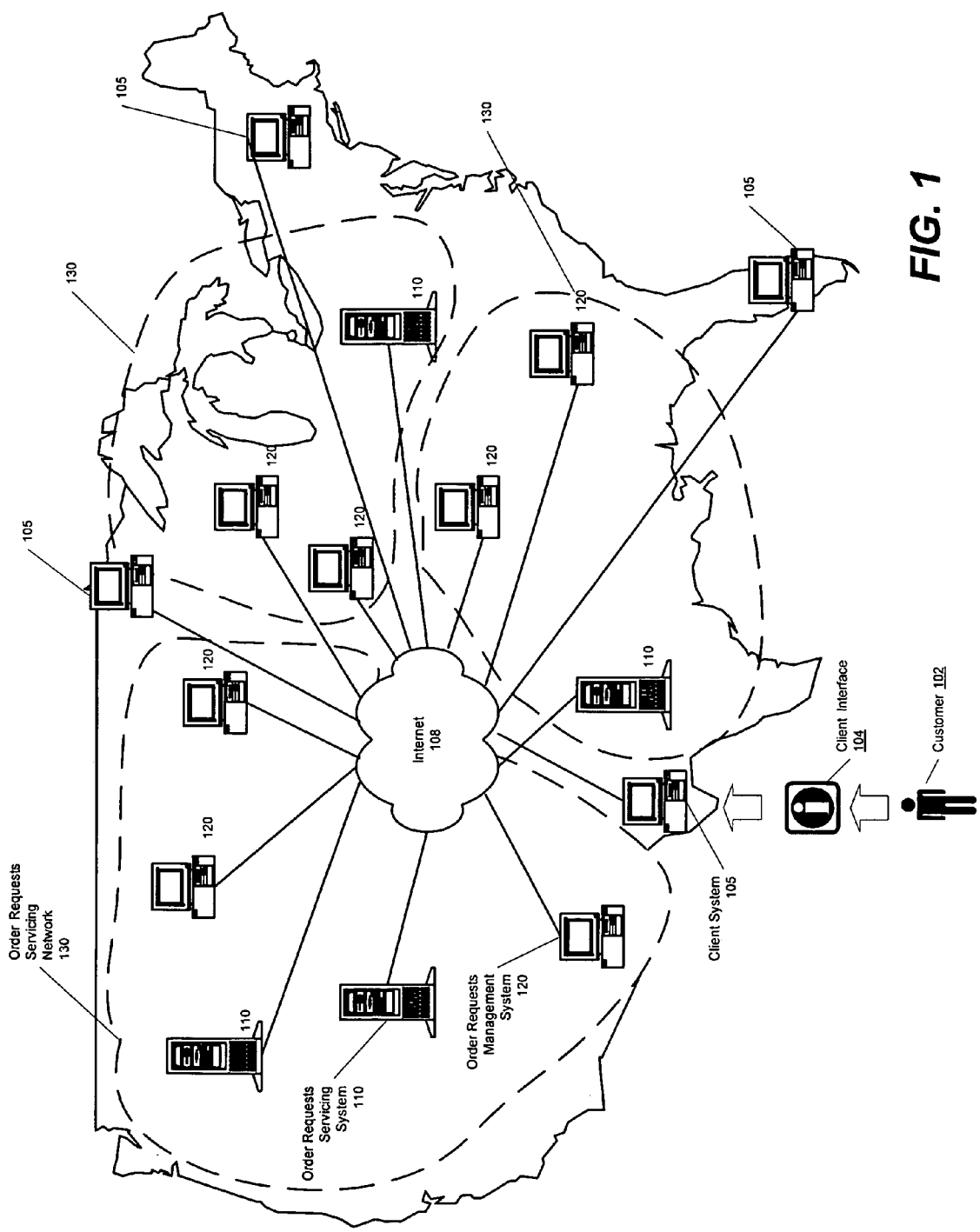
FIG. 1 shows an embodiment of an information integrating network as an order request servicing network, including multi-source order request servicing systems embodied as order request servicing systems and order request management systems embodied as order request management systems.

FIG. 1 shows an embodiment of a transaction processing system having an order requests servicing network, including order request servicing systems embodied as order request servicing systems and order request management systems embodied as order request management systems. In this embodiment, the components of each network communicate using the Internet 108. An order requests servicing network 130 is used by merchants selling and distributing items to receive, manage, and fulfill orders. An "order" is an example of an order request from a buyer, hereinafter "customer," to purchase at least one item from a seller. The term "item" is used herein to include both goods and services.

The order requests servicing network 130 can respond to a variety of order requests concerning orders. An order is a type of order request, and an order status (such as "item shipped" or "item on backorder") is a type of response to an order request. The term "order request" also includes a request to view information related to orders, such as a catalog, where the response is to present the catalog to the customer. An order request may be a request to return an item previously ordered, where responses are to credit the customer's account for the returned item, notify the customer of the credit, and transmit the item back to inventory. Generally, other types of order requests include a change to a previous order request, the response being to change the order request and respond accordingly to the changed order request; a cancellation of a previous order request, the response being to cancel the order request and any work in progress to respond to the order request; and an order request for the status of a previous order request, where the response is an order request status. Many other types of order requests are included in the term "order request" as used herein, and the corresponding responses are included in the term "order request response" as used herein. One skilled in the art will recognize that the system and method described for servicing orders can be used for servicing other types of order requests.

In order to represent the complex relationships in a multi-level supply chain, four different types of parties are used herein. The parties which may be involved in transmitting, managing, and fulfilling an order request include a customer, a client, an order request servicing organization, and one or more fulfillment partners. An order servicing organization is a type of an order request servicing organization that deals with orders. The customer submits an order request to the client, which submits an order request to the order servicing organization, which in turn uses fulfillment partners to fulfill the order request.

Each business in a supply chain may fulfill one or more roles in a supply chain, and a single business may fulfill one or more roles. For instance, a client serves both buyer and seller roles, because the client buys from a fulfillment partner and sells to the customer. As an example of a business fulfilling multiple roles, the customer and the client may be the same business and will probably fulfill the buyer role. Similarly, the client and the order servicing organization may be the same business, serving as either a buyer, a seller, or both. When the order servicing organization and the client are not the same business entity, the order servicing organization may act as an intermediary to service orders for many different clients.

Fulfillment partners include suppliers, resellers, distributors, and manufacturers that have a contractual relationship to a client. As an example of the four-party scenario above, a fulfillment partner sells items to an order servicing organization, which in turn sells the items to the client, which ultimately sells the item to the customer. Fulfillment partners may also include the order servicing organization itself or its divisions when the order servicing organization uses its own resources to fill an order. In a multi-level supply chain, a fulfillment partner may have its own complex supply chain involving multiple fulfillment partners of its own.

The parties involved in an order servicing network 130 are associated through relationships. For example, a client, order servicing organization, and fulfillment partner may have the following type of relationships:

An ordering relationship between the client and a fulfillment partner, indicating that the client has a business relationship with the fulfillment partner;

A pricing relationship between the client and the fulfillment partner. When the client and the order servicing organization are not the same business, a pricing relationship may exist between the client and the order servicing organization, and between the order servicing organization and the fulfillment partner;

An availability relationship between the fulfillment partner and the client;

An order fulfillment relationship between the fulfillment partner and the client; and A catalog relationship between the fulfillment partner and the client.

A customer 102, which may be a person or a business, transmits an order request, such as an order, to the client using a client interface 104 to a client system 105. Examples of a client interface 104 include a kiosk, a web storefront, an Internet terminal, or any other user interface to a client system 105. The client system 105 then transmits the customer 102 order request to the order servicing organization's order request servicing system 110. An example of an order request servicing system 110 is the OrderServer™ product by pcOrder.com, Inc.

A fulfillment partner is selected by the order request servicing system 110 to fulfill a portion or all of the order (order request). A selected fulfillment partner is called a provider. An order request management system 120 is a fulfillment partner's computer system for receiving, processing, and fulfilling order requests. An order request management system 120 may include an order request servicing system 110.

An order servicing network 130 includes an order request servicing system 110 and one or more order request management systems 120. An order servicing network 130 preferably includes a plurality of order request management systems 120 from which to select to fulfill an order request.

While the Internet is used herein as an example of how the order servicing network 130 is connected, other information networks may also be used. For example, the components of an order servicing network 130 could be connected using direct links such as T1 or ISDN lines, through satellite or cellular networks using wireless technology, or through a local data transport system such as Ethernet or token ring over a local area network. In addition, although the order servicing networks 130 shown in FIG. 1 do not overlap, order servicing networks 130 may overlap geographically and by including common order request servicing systems 110 or order request management systems 120.

The order request servicing system 110 analyzes an order request from the client system 105, may create processed order requests to be completed by an order request management system 120, may create processed order requests for other systems 202, and, if processed order requests are created, transmits the processed order requests to the appropriate computer systems.

If the order request from the client is an order, the order request servicing system 110 analyzes the order to identify items ordered and selects at least one order request management system 120 from the business relationships of the client using the client's routing rules. If more than one order request management system 120 is selected, the order request servicing system 110 prepares a provider order containing at least one item for each selected order request management system 120. The order request management system 110 receives the provider order, processes the order, and provides the at least one item to the customer. During the entire process, the order request servicing system 110 integrates all order information from the providers' order request management systems, providing a single integrated source of complete, accurate, and timely order status information. A single integrated source of order information is possible in an order servicing network despite the fact that a complex network of suppliers, each managing its own orders with its own order request management system 120, is involved in actually filling the order.

FIG. 1 shows several client systems 105, which enable a customer to transmit an order request, such as an order, which the client system 105 communicates to the order request servicing system 110. A client system 105 of an order request servicing system 110 may take any of the following forms:

- Any computer system with a client interface 104 that is used by customers 102 to transmit order requests, such as orders, to an order request servicing system 110. Examples of a client interface 104 include a kiosk, a web storefront, an Internet terminal, or any other user interface to a client system 105. The client system 105 transmits the order request over a network (via an EDI gateway or an XML gateway) to the order request servicing system 110.
- an order request servicing system 110 recursively calling itself to transmit an order. In this case, a single order request servicing system 110 serves as both a client and a server; or
- a first order request servicing system 110 calling a provider's order request management system 120, where the provider's order request management system includes a second order request servicing system 110. The first order request servicing system 110 acts as a client system 105 of the second order request servicing system 110. This architecture allows a client or order servicing organization to chain multiple fulfillment partners, each with its own complex supply chains, to form an integrated source of order information.

The client system 105 provides an order request from the customer, such as an order, to the order request servicing system 110.

One of the strengths of the order request servicing system 110 is that it can communicate with a variety of provider order request management systems 120. The order servicing organization provides the order request servicing system 110 with an implementation of an interface to each order request management system 120, which enables the order request servicing system 110 to communicate with the order request management system 120 as if the two systems were one.

The term centralized is used to describe the order request servicing system 110 not because of its physical location, but because communications between client systems 105 and order request management systems 120 pass through the order request servicing system 110. The centralized nature of the communications provides the client with a single integrated source of order information, the order request servicing system 110. The order servicing network 130 of order servicing organizations and fulfillment partners is completely transparent to the customer. This transparency enables the client to present a virtual direct sales model to its customers. In this situation, the order request servicing system 110 serves as a hub of an order servicing network 130.

An order servicing organization may use a single order request servicing system 110 to service the orders of multiple clients. The order request servicing system is designed to enable different business relationships and business rules to be followed for fulfilling orders of each client. This design enables complex supply chains to be modeled and provides the flexibility needed to enable the virtual direct sales model. Again in this situation, the order request servicing system 110 serves as a hub of the order servicing network 130.

A provider's order request management system 120 may include, but is not required to include, an order request servicing system 110. If the provider's order request management system 120 includes an order request servicing system 110, then the provider's order request servicing system 110 is a spoke in the order servicing organization's order servicing network 130. The flexibility of the design of the order request servicing system 110 allows the order request servicing system 110 to serve as either a hub or a spoke in an order servicing network 130. The capability to chain multiple order request servicing systems 110 together allows very complex supply chains to be modeled and enables a virtual direct sales model.

Figure 1A:
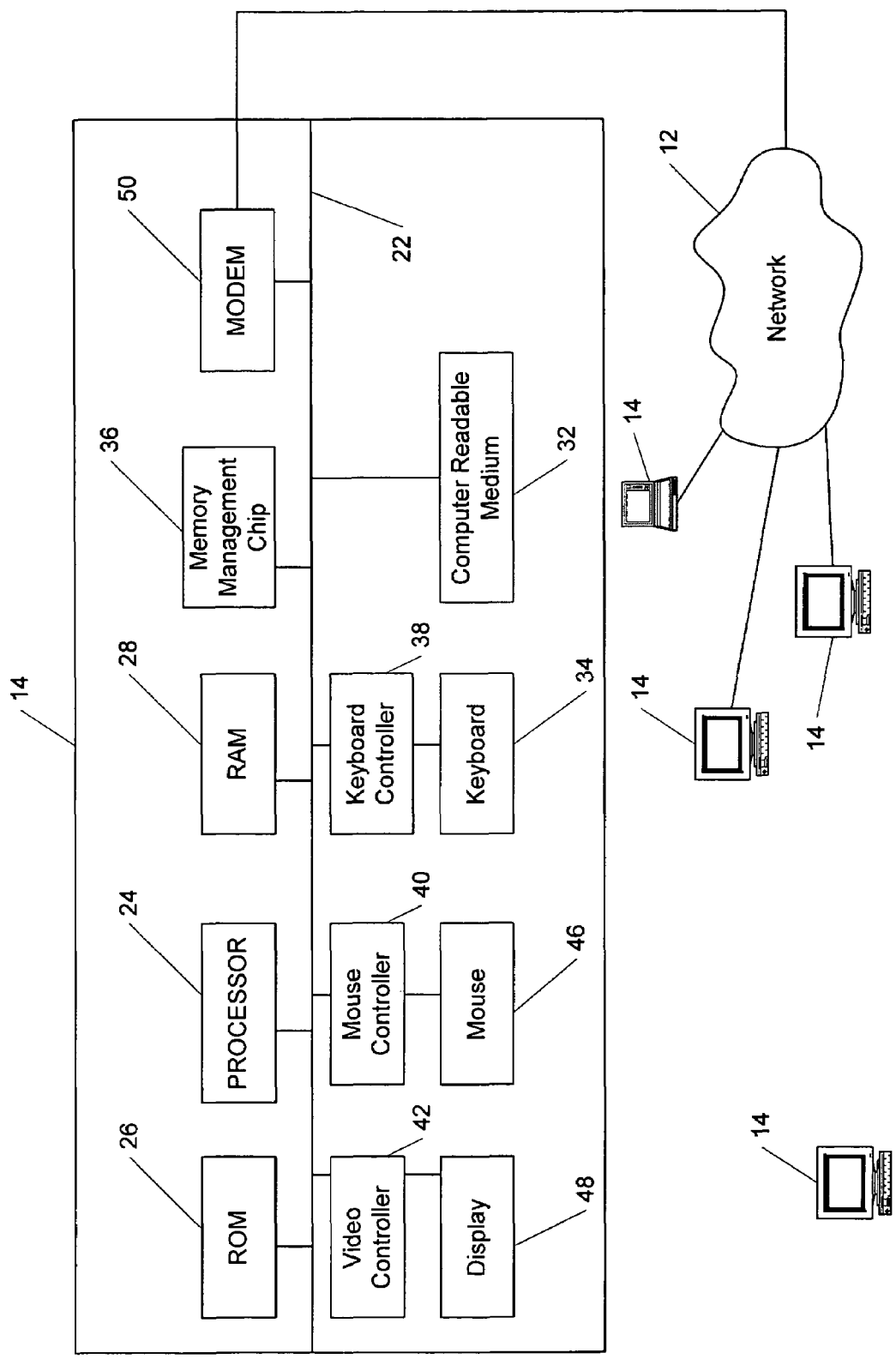
FIG. 1A is a block diagram of a computer system.

FIG. 1A is a block diagram of a computer system, such as client systems 105, order request servicing systems 110, and order request management systems 120 shown in FIG. 1. FIG. 1A depicts several computer systems 14. Computer systems 14 may communicate with one or more other computer systems 14 via a network 12, such as the Internet. In one embodiment, each computer system 14 includes one or more system buses 22 placing various components of the system in data communication. For example, system bus 22 allows data communication between processor 24 and both a read only memory (ROM) 26 and random access memory (RAM) 28.

The ROM 26 contains among other code, the Basic Input-Output system (BIOS) which controls basic hardware operation such as the interaction with peripheral components such as keyboard 34. Applications resident with a computer system 14 are generally stored on and accessed via a computer readable medium 32, such as a hard disk drive, optical drive, floppy disk drive, compact disk, or other storage medium. Additionally, applications may be in the form of electronic signals modulated in accordance with the application and data communication technology when accessed via network 12.

The RAM 28 is the main memory into which the operating system and application programs are loaded and generally affords at least 32 megabytes of memory space. Through data communication on system bus 22, memory management chip 36 controls direct memory access (DMA) operations. DMA operations include passing data between the RAM 28 and the mass storage memory 32. Also in data communication with the system bus 22 are various I/O controllers: a keyboard controller 38, a mouse controller 40 and a video controller 42. The keyboard controller 38 provides a hardware interface for the keyboard 34, the mouse controller 40 provides the hardware interface for a mouse 46, or other point and click device, and the video controller 42 provides a hardware interface for a display 48.

A modem 50 or network circuitry (not shown) enables networked computer systems 14 to communicate data over a network 12 via any of various data communication technologies such as digital subscriber lines ("DSL"), asynchronous DSL, ISDN, or ordinary telephone lines. The operating system 52 of the computer system 14 may be WINDOWS NT, UNIX, or any other known operating system. The RAM 28 also supports a number of Internet access tools, including, for example, an HTTP-compliant Web browser having a JavaScript interpreter, such as Netscape Navigator 3.0, Microsoft Explorer 3.0, and other similar browsers.

Those skilled in the art will appreciate that the computer system shown in FIG. 1A encompasses all types of computer systems including, for example, mainframes, minicomputers, workstations, servers, personal computers, Internet terminals, network 1A appliances, notebooks, palm tops, personal digital assistants, and embedded systems. Computer system 14 may include additional or fewer components than shown in FIG. 1A and described herein.

Figure 2:
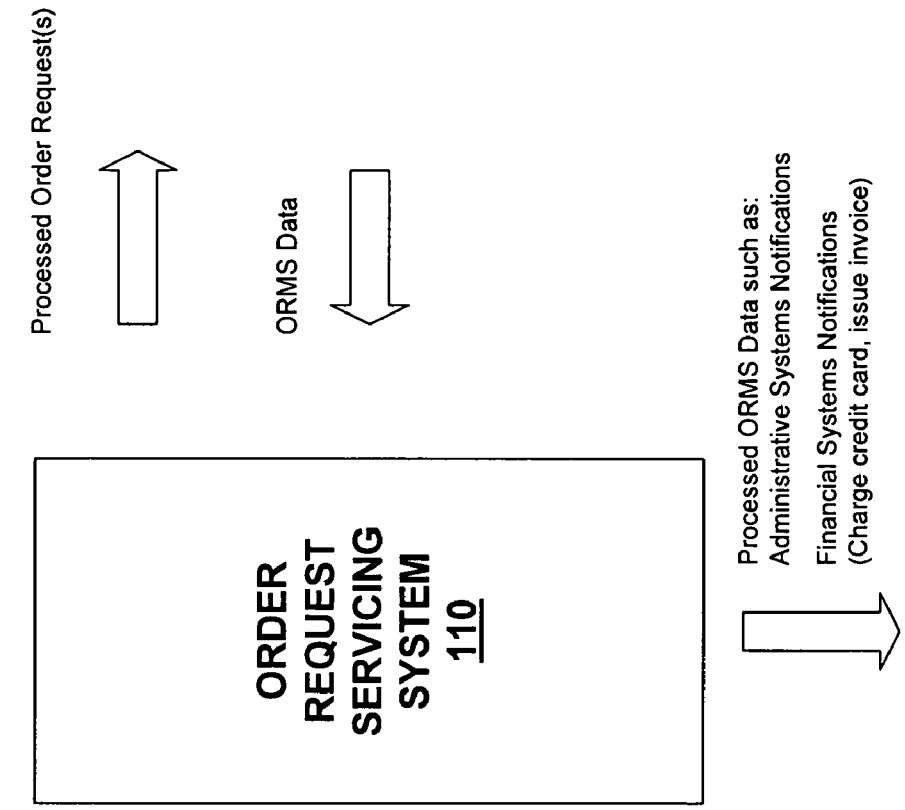
FIG. 2 shows an overview of the operation of the order request servicing system of FIG. 1.

FIG. 2 shows an overview of the operation of an embodiment of a multi-source order request servicing system, the order request servicing system 110. As shown in FIG. 2, an order request such as an order placement or order inquiry flows from a customer to a client system 105 through an order request servicing system 110 to an order request management system 120. Order request management system data such as a response to the order request flows back from the order request management system 120 through the order request servicing system 110 and client system 105 to the customer 102.

For example, a customer 102 uses a client system 105 to transmit an order request, such as an order, to the order request servicing system 110. Upon receiving an order request from the client system 105, the order request servicing system 110 analyzes the order request and may transmit a processed order request management system 120. If the client transmits an order, the order request servicing system 110 transmits at least one processed order request in the form of a provider order to at least one order request management system 120. When the order request servicing system 110 receives a response to an order request, such as a provider order status order request management system data, it analyzes the information to determine whether to transmit additional transactions to the order request management systems 120. Order request servicing system 110 also determines whether to transmit additional processed order request management system data, such as notification transactions to other systems 202 and the client system 105, as shown at the bottom of FIG. 2. These notification transactions include, but are not limited to, confirmations of orders and shipment to the client system 105, which in turn notifies the customer 102. Notification transactions also include other system 202 notification transactions, such as administrative systems notification transactions and financial systems notification transactions. Examples of a financial system notification are notification of an order request to charge the order to a credit card and notification of an order request to issue an invoice.

A response to an order request flows from the provider order request management systems 120 through the order request servicing system 110 and the client system 105 to the customer 102. Both responses to order requests in real-time (allowing for processing and communication delays) and responses to a batch order request for an order request responses are communicated through the order request servicing system 110. An example of an order request management system data flow from an order request management system 120 to a customer is a change in an order status detected as a result of analyzing a periodic batch order request by the order request servicing system 110 for updated provider statuses. Each provider order status is communicated to and analyzed by the order request servicing system 110 to produce an integrated order status for the order from which the provider order originated. A notification of the change in the integrated order status is sent via the client system 105 to the customer 102. The updated provider order status may result in additional processed order request sent to order request management systems 120 and additional processed order request management system data, such as notification transactions, sent to other systems 202, as shown at the bottom of FIG. 2.

Figure 3:
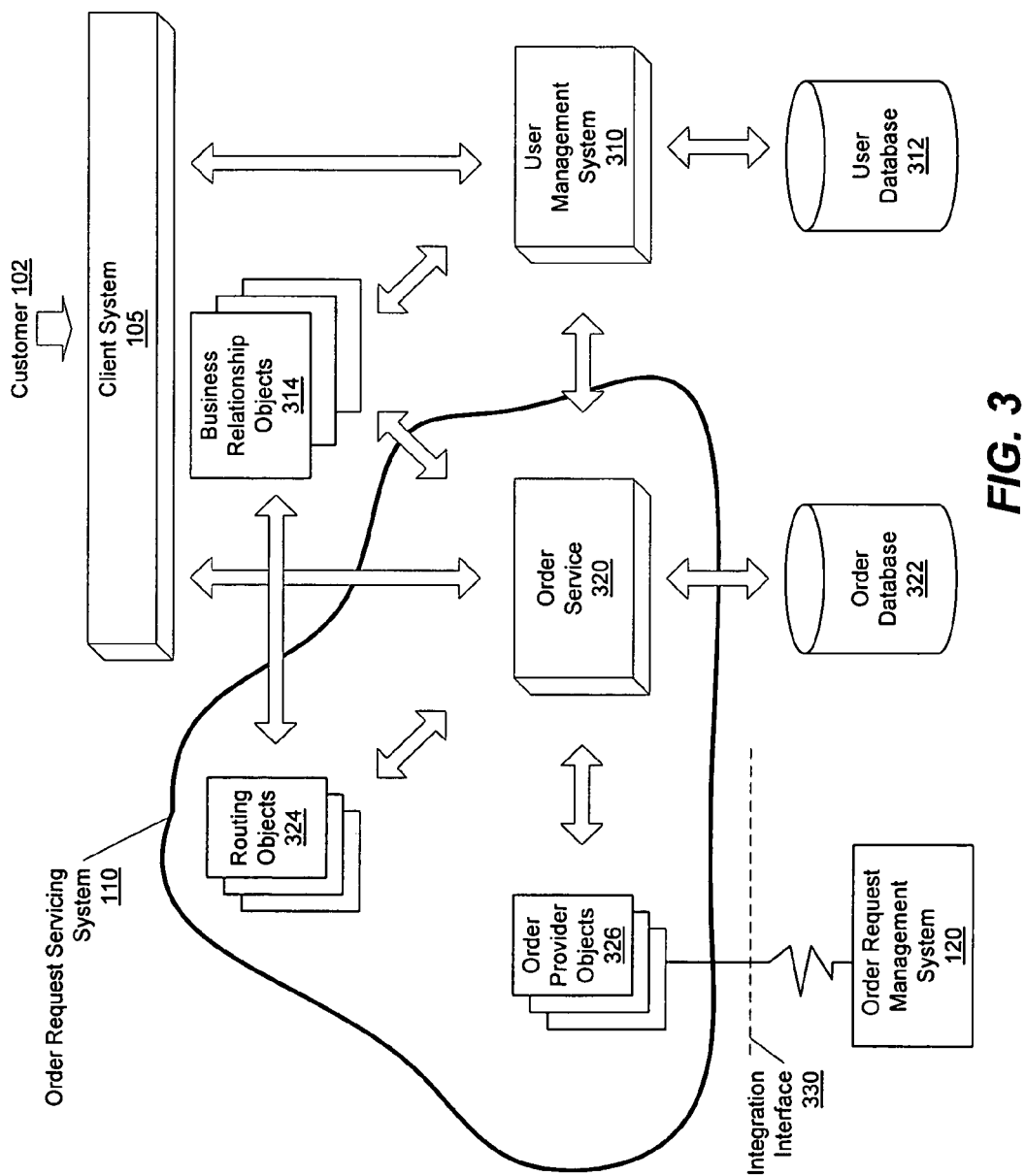
FIG. 3 shows the environment in which the order request servicing system of FIG. 1 operates.

FIG. 3 shows an environment in which the order request servicing system 110 operates in responding to an order request in the form of an order. A user management system 310 that resides outside the order request servicing system 110 manages a user database 312. The user database 312 contains information about authorized clients of the order request servicing system 110, including each client's relationships to its fulfillment partners.

Order service 320 is the core of the order request servicing system 110 that serves as a central point for collecting data and processing orders. In the embodiment shown in FIG. 3, the order request servicing system 110 is an object-oriented system using routing objects 324 and Order Request Provider Objects 326 to process orders.

Order service 320 receives an order request in the form of an order from a client system 105. Order Service 320 then requests the user management system 310 to retrieve business relationships from the user database 312 for the client of the order. Business relationships include an identification of associated business rules to be used in fulfilling the order for the client.

If the order request is an order, a routing object 324 determines whether the order should be split into portions, with one portion for each provider selected to provide an item included in the order. As noted above, the term "item" encompasses both goods and services. The term "item" is also used herein to include multiple quantities of the same good or service. As used herein, an order for one computer, one printer, and five monitors could be interpreted several ways depending on the business rules and relationships of the client. The order could be interpreted as containing seven items, the first item being the computer, the second item being the printer, and the third through seventh items each being one of the five monitors. According to the business rules of another organization, the same order could be interpreted as three items, the first item being the computer, the second item being the printer, and the third item being the five monitors. Still another interpretation might be that the order contains four items, the first item being the computer, the second item being the printer, the third item being a subset of the five computers, and the fourth item being the remaining subset of the five computers. Yet another interpretation might be that the order includes two items, the first item comprising a computer system including the computer, printer, and one of the monitors, and the second item being the remaining four monitors. Many other permutations are possible depending upon the business rules and relationships of the client.

Routing rules for selecting a fulfillment partner of a particular client are encapsulated in a routing object 324. The routing object 324 uses routing rules to select from the client's business relationships a fulfillment partner to provide each item ordered. Each selected fulfillment partner is called a provider. Routing objects 324 communicate the selected providers for the order to order service 320 by producing a fulfillment plan which pairs each item in the order with a selected provider.

Based upon the fulfillment plan, order service 320 creates a provider order for each provider selected to fulfill the order. Each provider order includes at least one item to be provided by the provider. An integration interface 330 is used to ensure that each provider order 440 corresponds to the corresponding provider's order request management system 120 format.

An integration interface 330 consists of an interface, which specifies the types of transactions that are necessary to communicate with a type of multi-source order request servicing system such as order request management system 120, and an implementation of the interface, which provides the procedures and data structures necessary for communicating with a particular order request management system 120. An integration interface 330 provides the information necessary to reformat an order request such as an order from a format of the order request servicing system 110 to a format of the order request management system 120. The term "format" is used herein to describe the structure of the data and the procedures used to transmit and receive data so that the data can be understood by the receiving system.

In the embodiment described above for FIGS. 3 and 4, the interface implementation includes integration objects that translate data from the order request servicing system 110 format to the order request management system 120 format. An integration object transmits a transaction to the order request management system 120. Integration objects may be implemented as application program interfaces (APIs), including Java classes. An example of an integration interface 330 implementation is an Order Request Provider Object 326, which is used to construct and transmit provider orders 440 that correspond to the selected provider's order request management system 120 format.

Order service 320 stores a copy of the provider order in order database 322, including provider information and a provider order status. Other embodiments of a multi-source order request servicing system may include other types of databases to store order requests and order request responses. Each provider order record is linked to the at least one order record for the order from which the provider order originates. Routing object 324 routes the provider order to an Order request Provider Object 326, which in turn transmits the provider order to the provider's order request management system 120.

An Order Request Provider Object 326 is a type of integration object. Each Order Request Provider Object 326 represents a provider and defines procedures for transmitting order requests to the provider's order request management system 120 and receiving order request management system data such as order request responses from the provider's order request management system 120. An Order Request Provider Object 326, in one embodiment, must know how to validate an order from a client for a selected order request management system 120, transmit a provider order to the provider's order request management system 120, and obtain an provider order status from the provider's order request management system 120.

Figure 4:
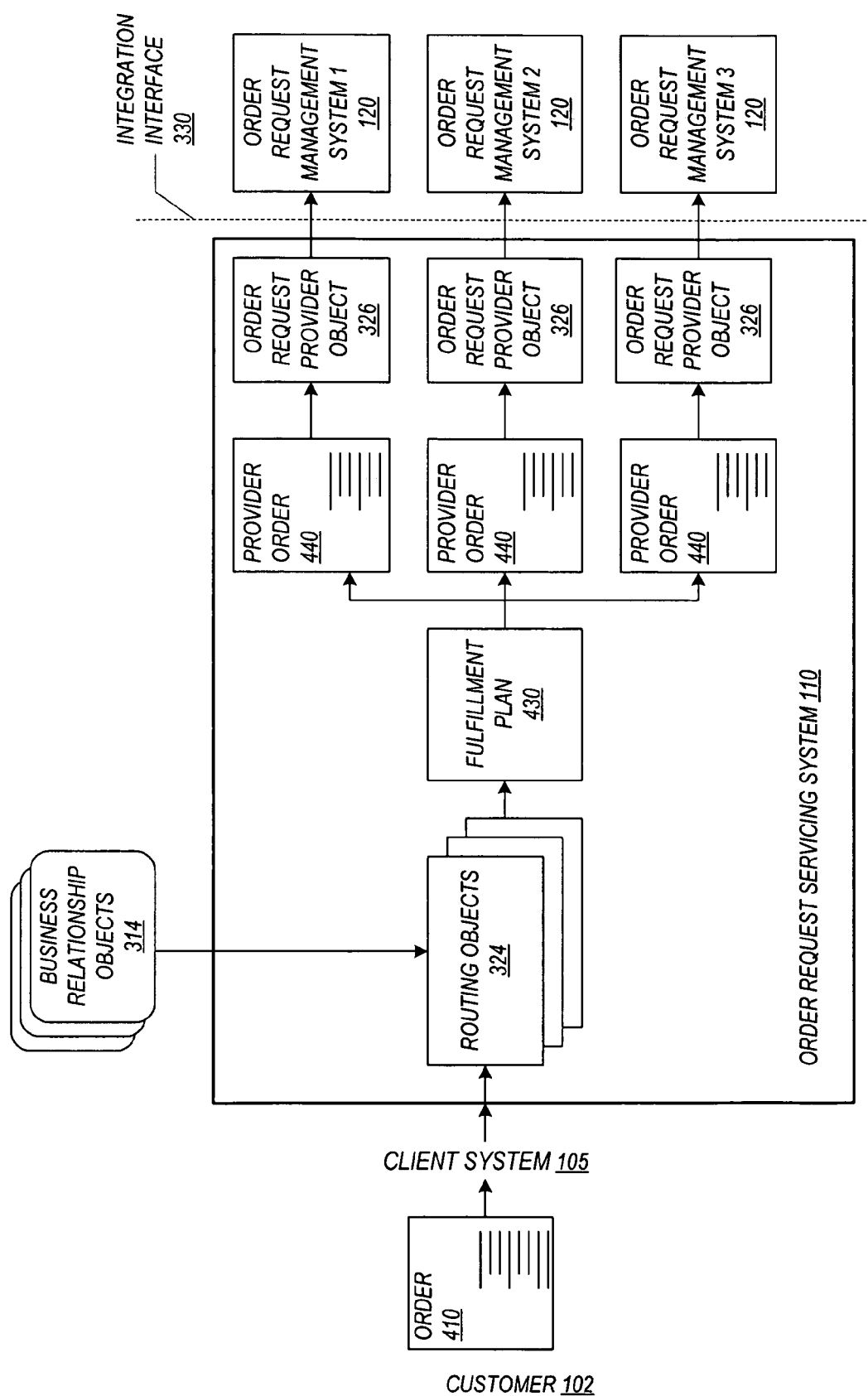
FIG. 4 shows an information flow of the order request servicing system of FIG. 3 in response to receiving an order request in the form of an order.

FIG. 4 shows an information flow resulting from receiving an order request in the form of an order through an embodiment of a multi-source order request servicing system, the order request servicing system 110 shown in FIG. 3. A client system 105 transmits an order 410 from a customer 102 to the order request servicing system 110. The order request servicing system 110 receives the order 410 and uses a routing object 324 to determine whether to split the order into portions according to the different items ordered. The routing object 324 selects a provider for each item from the business relationships retrieved by the user management system 310 and associated routing rules. The routing object 324 produces a fulfillment plan 430 for the order indicating a selected provider for each item ordered. Provider orders 440 are created by the routing object 324 for each provider selected. Order Request Provider Objects 326 transmit the provider orders 440 to the providers' order request management systems 120. Each provider order contains only the items that the corresponding provider is to supply.

Figure 5:
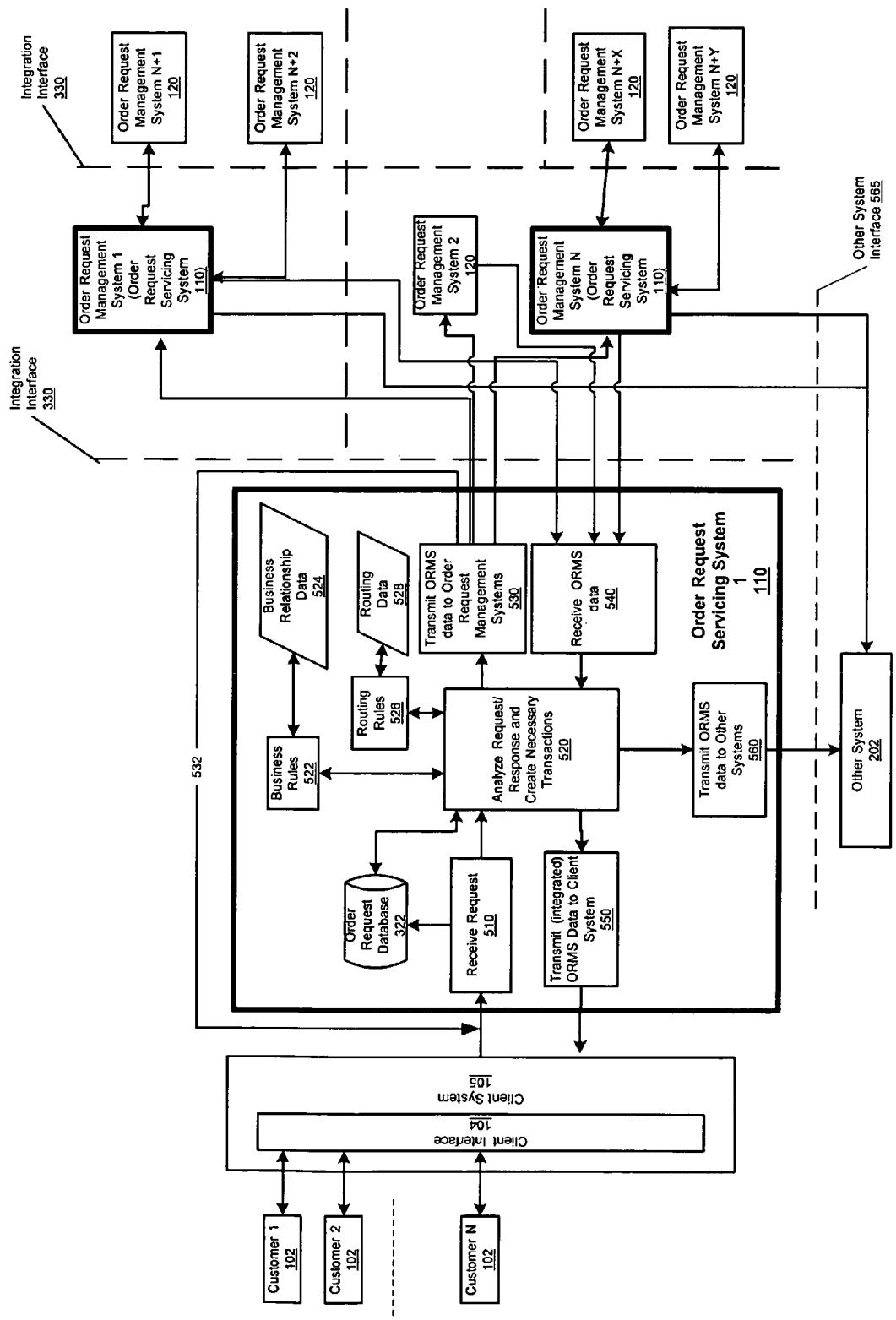
FIG. 5 is a detailed block diagram of one embodiment of the order request servicing system.

FIG. 5 is a detailed block diagram of one embodiment of a multi-source order request servicing system, the order request servicing system 110. Customers 102 place an order request using a client system 105, which provides a client interface 104. Types of client interfaces 104 include but are not limited to kiosks, computer systems accessing a web storefront, and computer systems communicating with the order request servicing system 110 via a network interface. Order request servicing systems 110 transmit processed order requests to order request management systems 120 and other systems 202. The order request servicing system 110 contains a number of modules, common to multi-source order request servicing systems, which will be discussed in further detail below.

The detailed diagram for order request servicing system 1 shows several information flows through the order request servicing system 110. In the Receive Order request 510 module, the order request servicing system 110 receives an order request from a client system 105. Components of order service 320 of FIG. 3 are included in the Receive Order request 510 module.

The order request servicing system 110 can receive data via a network interface such as an electronic data interchange (EDI) gateway or an extensible markup language (XML) gateway. The EDI gateway used by order request servicing system 110 can receive data by electronic data interchange, by file transfer protocol, by Internet protocol, and from value-added networks. The XML gateway can receive data by hypertext transfer protocol (HTTP) from markup languages, including hypertext markup language (HTML) and extended markup languages such as XML.

If the order request is an order, at least one record of the order is created and stored in order database 322.

In the Analyze Order Request/Response and Create Necessary Transactions module 520, the order request servicing system 110 determines the source and type of order request, determines the necessary transactions to respond to the order request and to notify other systems 202 of the order request, and creates those transactions. The Analyze Order Request/Response and Create Necessary Transactions module 520 may use business rules 522, business relationship data 524, routing rules 526, and routing data 528 to determine the necessary transactions and the appropriate systems to receive transactions (such as order requests and order request management system data) for the order request. In the object-oriented embodiment of the order request servicing system 110 shown in FIGS. 3 and 4, the order request servicing system 110 uses routing objects 324 and business relationship objects 314 to generate transactions. The Analyze Order Request/Response and Create Necessary Transactions module 520 also structures the transactions in a format corresponding to the receiving systems. In the object-oriented embodiment of the order request servicing system 110 shown in FIGS. 3 and 4, the order request servicing system 110 uses Order request Provider Objects 326 to ensure that the transactions correspond to the format of the order request management systems 120.

Transactions created for an order by the Analyze Order Request/Response and Create Necessary Transactions module 520 are sent to the appropriate systems by the Transmit Transactions to Order request management systems module 530 and the Transmit Transactions to Other Systems module 560. As noted on the diagram, each transaction directed to an order request management system 120 must pass through an integration interface 330 to ensure that the order request management system 120 can process the transaction. Similarly, each transaction of order request management system data sent to an other system must pass through an other systems interface 565 to ensure that the transaction corresponds to the receiving system. The Analyze Order Request/Response and Create Necessary Transactions module 520 ensures that each transaction corresponds to the receiving systems when the transaction is created. The Transmit Processed Order Request to Order request Management Systems module 530 uses the Order request Provider Objects 326 described above to transmit provider orders to the order request management systems 120.

Information also flows from the order request management systems 120 through the order request servicing system 110 to the client system 105 to the customer. Receive order request management system data module 540 receives order request data, such as provider order statuses, from order request management systems 120 which may be responses to order requests such as order inquiries.

The Analyze Order Request/Response and Create Necessary Transactions module 520 analyzes the order request management system data from the order request management systems 120. The order request management system data is analyzed in a manner similar to that described for analyzing order requests from client systems 105. If the order request management system data is a provider order status, the order request servicing system 110 may integrate all provider order statuses for the order and provide an updated order status to the client system 105 to be communicated to the customer 102. The Analyze Order Request/Response and Create Necessary Transactions module 520 also structures each transaction in a format corresponding to the system to receive the information.

FIG. 5 also illustrates the flexibility of the order request servicing system 110. As described above, the order request servicing system 110 communicates with a variety of diverse order request management systems 120, which meets a long-felt need to communicate with multiple fulfillment partners' order request management systems 120 to obtain current and accurate order status information.

In addition, the order request servicing system 110 can recursively call itself to fill an order. For example, if a division of an order servicing organization fills the organization's own orders, one of the order request management systems 120 called by the order request servicing system 110 includes the order request servicing system 110 itself. The recursive call from order request servicing system 1 to itself is shown by arrow 532 in FIG. 5.

Finally, the order request servicing system 110 can interface with a provider's order request management system 120 that is also an order request servicing system 110, as shown by the order request servicing system 2 and order request servicing system N modules in FIG. 5. The ability to chain multiple order request servicing systems 110 together enables a business to model its complex supply chains and to present a virtual direct sales model to its customers. In the embodiment shown in FIG. 5, each of order request servicing system 2 and order request servicing system N serves a spoke in the order servicing network 130 with order request servicing system 1 as a hub. In addition, each of order request servicing system 2 and order request servicing system N serves as a hub in its own order servicing network 130.

Figure 6:
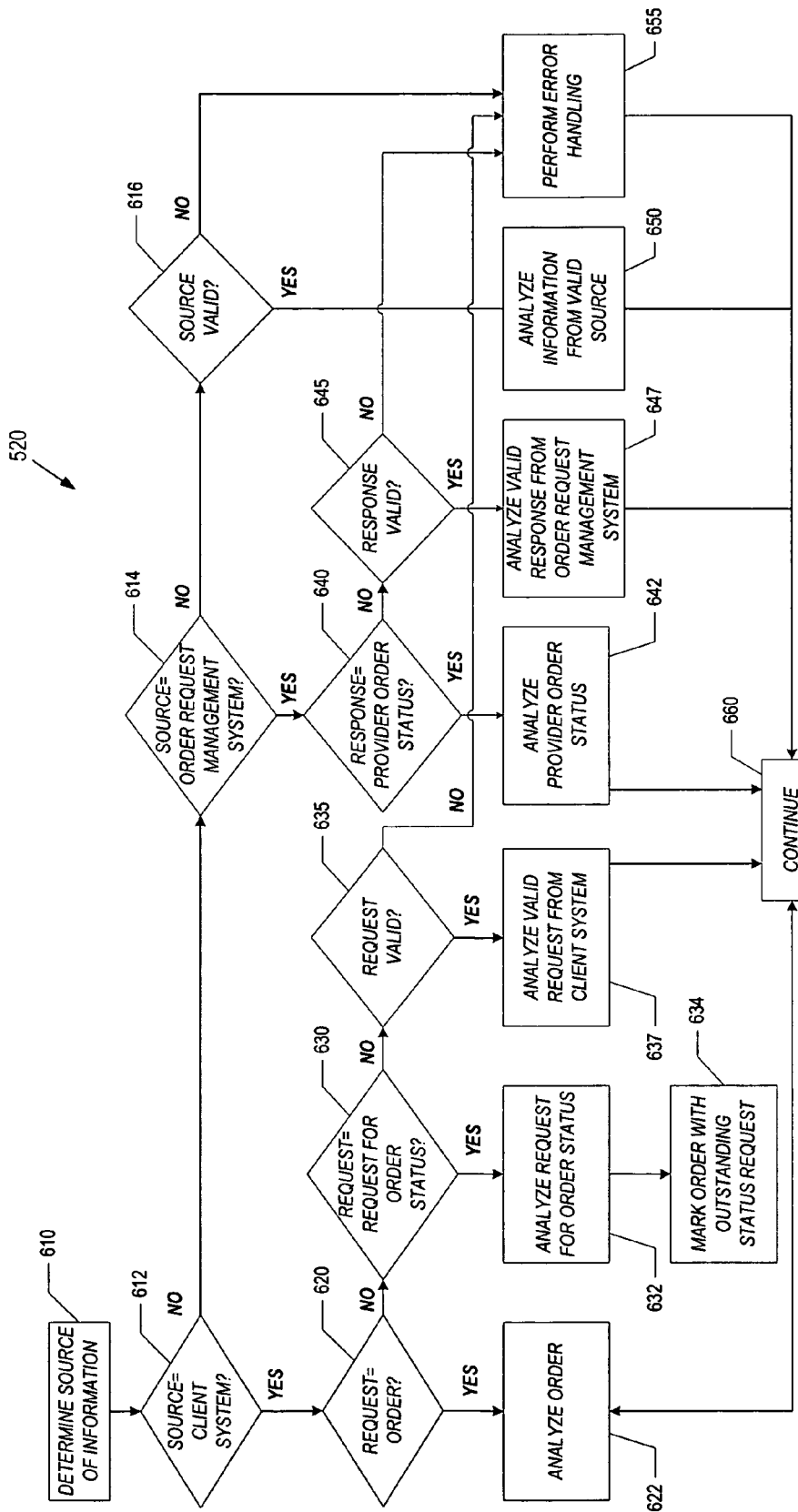
FIG. 6 shows a flowchart of the operation of the Analyze Order Request/Response and Create Necessary Transactions module of the order request servicing system of FIG. 5.

FIG. 6 shows a flowchart of the operation of the Analyze Order Request/Response and Create Necessary Transactions module 520. The types of order requests and responses shown in FIG. 6 are for illustrative purposes only, as the order request servicing system 110 can analyze many other types of order requests and responses.

Step 610, Determine Source of Information, includes determining the source of information received by the Receive Order request 510 module and the Receive Response 540 module. In step 612, the order request servicing system 110 determines whether the source of the information is the client system. If the source is not the client system, the information received may be a response and order request servicing system 110 proceeds to step 614. If the source is the client system, the information received is an order request and order request servicing system 110 proceeds to step 620.

In step 620, order request servicing system 110 has received an order request. Order request servicing system 110 determines whether the order request is an order. If the order request is not an order, order request servicing system 110 proceeds to step 630. If the order request is an order, order request servicing system 110 proceeds to step 622.

In step 622, order request servicing system 110 analyzes the order and creates the necessary transactions to fulfill the order. Step 622 will be discussed in further detail below. After completing step 622, the order request servicing system 110 proceeds to step 660.

Returning to step 630, if the order request is not an order, the order request servicing system 110 determines in step 630 whether the order request is an order request for order status. If the information is not an order request for order status, the order request servicing system 110 proceeds to step 635 to determine whether the information represents another valid type of client order request. If so, the order processing system 110 proceeds to step 637 to process the information, and then proceeds to step 660. If not, order request servicing system proceeds to step 655 to perform error handling and then proceeds to step 660.

Returning to step 630, if the order request is a valid order request for order status, the order request servicing system 110 proceeds to step 632 to analyze the order request and create necessary transactions to fulfill the order request. Step 632 will be discussed in more detail below. From step 632, the order request servicing system 110 proceeds to step 634 to mark the order records stored in order database 322 with a notation that an order request for order status is outstanding. From step 634, the order request servicing system 110 proceeds to step 660. The order request servicing system 110 then waits to receive the provider order statuses from the provider order request management systems 120.

Returning to step 614, if the source of the information is not an order request management system 120, the order request servicing system 110 proceeds to step 616 to determine whether the source is another valid source of information. Step 616 and step 650 illustrate that the order request servicing system 110 may process information from sources in addition to the client systems 105 and order request management systems 120. From step 650, order request servicing system 110 proceeds to step 660. If the source is not valid, order request servicing system proceeds to step 655 to perform error handling and then proceeds to step 660.

In step 614, if the source of the information received is an order request management system 120, the information received is order request management system data such as an order request response. Order request servicing system 110 proceeds to step 640 to determine whether the response is a provider order status. If the order request response is not a provider order status, the order request servicing system 110 proceeds to step 645 to analyze whether the response is another valid type of response and to step 647 to process the other response from the order request management system 120. Step 645 and step 647 illustrate that the order request servicing system 110 may process other types of responses from order request management systems 120 in addition to provider order statuses. From step 647, order request servicing system 110 proceeds to step 660. If the information received is not a valid response, order request servicing system proceeds to step 655 to perform error handling and then proceeds to step 660.

Returning to step 640, if the response is a provider order status, in step 642 the order request servicing system 110 analyzes the provider order status and creates the necessary order request management system data transactions to correspond to the request response. For instance, the order request servicing system 110 may determine that it is desirable to order request provider order statuses for each provider order related to the order to provide an updated order status to the client system 105. Step 642 will be discussed in more detail below. Upon completing step 642, the order request servicing system 110 proceeds to step 660.

In step 655, order request servicing system 110 has received information that is not a valid order request or response. Order request servicing system 110 performs error handling and then proceeds to step 660.

From steps 634, 637, 642, and 647, the order request servicing system 110 proceeds to step 660. In step 660, the order request servicing system 110 has completed processing of the Analyze Order Request/Response and Create Necessary Transactions module 520 and continues to module 530 of FIG. 5 to transmit the created processed order request transactions to the corresponding order request management systems 120. Order request servicing system 110 may also continue to module 560 to transmit processed order request management system data transactions to other systems 202.

FIG. 7 shows a flowchart of the operation of the Analyze Order step 622 of FIG. 6. In step 710, the order request servicing system 110 verifies the client's credentials to ensure that the client has proper authority to order items using the order request servicing system 110. In the embodiment of the order request servicing system 110 shown in FIGS. 3 and 4, order service 320 calls the user management system 310 to verify the client's credentials. In step 712, the order service 320 creates one or more records to represent the order 410 in order database 322. In step 714, the order service 320 order requests relationship information for the client from user management system 310. The relationship information is used to select the fulfillment partners to provide the items in the client's order. In step 716, the routing object 324 selects providers for each item ordered by the client from the relationships for the client retrieved in step 714.

In step 718, the routing object 324 generates a fulfillment plan 430 for the order 410, with each item of the order related to a provider fulfillment partner. In step 720, order service 320 creates processed order request transactions in the form of a provider order 440 for each order request management system 120 to fulfill one or more items of the order. Each provider order 440 must correspond to the order format required by the corresponding provider's order request management system 120. A routing object 324 uses an Order request Provider Object 326 to translate data from the order request servicing system 110 format to the selected order request management system 120 format. The Order request Provider Object 326 transmits the provider order 410 to the corresponding provider's order request management system 120.

In step 722, the order request servicing system 110 determines whether other system 202 notification transactions are needed in addition to the provider order. If other system 202 notification transactions are not needed in step 722, the order request servicing system 110 proceeds to step 730 to continue processing. If other system 202 notification transactions are needed, order request servicing system 110 proceeds to step 724 to create order request management system data notification transactions for the corresponding other systems 202. For example, billing information might be provided to a financial system for invoicing immediately upon generating the fulfillment plan. In the object-oriented embodiment described above, notification objects are created. Order request servicing system 110 then proceeds to step 730, which completes processing of step 622, Analyze Order and Create Necessary Transactions. The order request servicing system 110 has also completed module 520, Analyze Order Request/Response and Create Necessary Transactions. Order request servicing system 110 may then use module 550 of FIG. 5 to transmit the created transactions to the client systems 105. Order request servicing system may use module 560 to transmit the created transactions to the other systems 202.

FIG. 8 shows a flowchart of the operation of the Analyze Order Request/Response for Order Status 632 module. The order request servicing system 110 may request updated provider order status information from the order request management systems 120 in real-time (allowing for transmission and processing delays). For example, a real-time query might be issued in response to a customer order request for an order status. Each order request management system 120 will provide a provider order status in response to an order request for order status. The order request servicing system 110 determines an overall order status from the related provider order statuses, which it conveys to the order requesting client system 105, which in turn conveys the order status to the customer.

The order request servicing system 110 may also receive provider order statuses from its own batch order request for order status. The order request servicing system 110 determines the effect of the updated provider order statuses on the related order statuses. The order request servicing system 110 notifies the client system 105 of changes in order status but may create no transactions if the order status has not changed. In response to a notification transaction, the client system 105 notifies the customer.

The customer provides an order number in the order request for order status. In step 810, order service 320 verifies the order number supplied. In step 820, the order service 320 retrieves the provider order 440 records from order database 322 that are associated with the order number. In step 830, order service 320 prepares processed order request transaction in the form of an order request for provider order status to each provider's order request management system 120.

In step 840, the order request servicing system 110 determines whether other system 202 notification transactions are needed in addition to the order requests for provider order statuses. If other system 202 notification transactions are not needed in step 840, the order request servicing system 110 proceeds to step 860 to exit the analysis of the order request for order status and return to module 530 of FIG. 5, Transmit Transactions to Order request management systems. If other system 202 notification transactions are needed, order request servicing system 110 proceeds to step 850 to create the order request management system data notification transactions for the corresponding other systems 202. Order request servicing system 110 then proceeds to step 860, which completes step 632, Analyze Order Request/Response for Order Status and Create Necessary Transactions. The order request servicing system 110 has also completed module 520, the Analyze Order Request/Response and Create Necessary Transactions, and uses module 550 of FIG. 5 to transmit the created processed order request management system data transactions to the order request management systems 120 and other systems 202. A response to the order request will be provided by the Analyze Provider Order Status 642 step.

Figure 9:
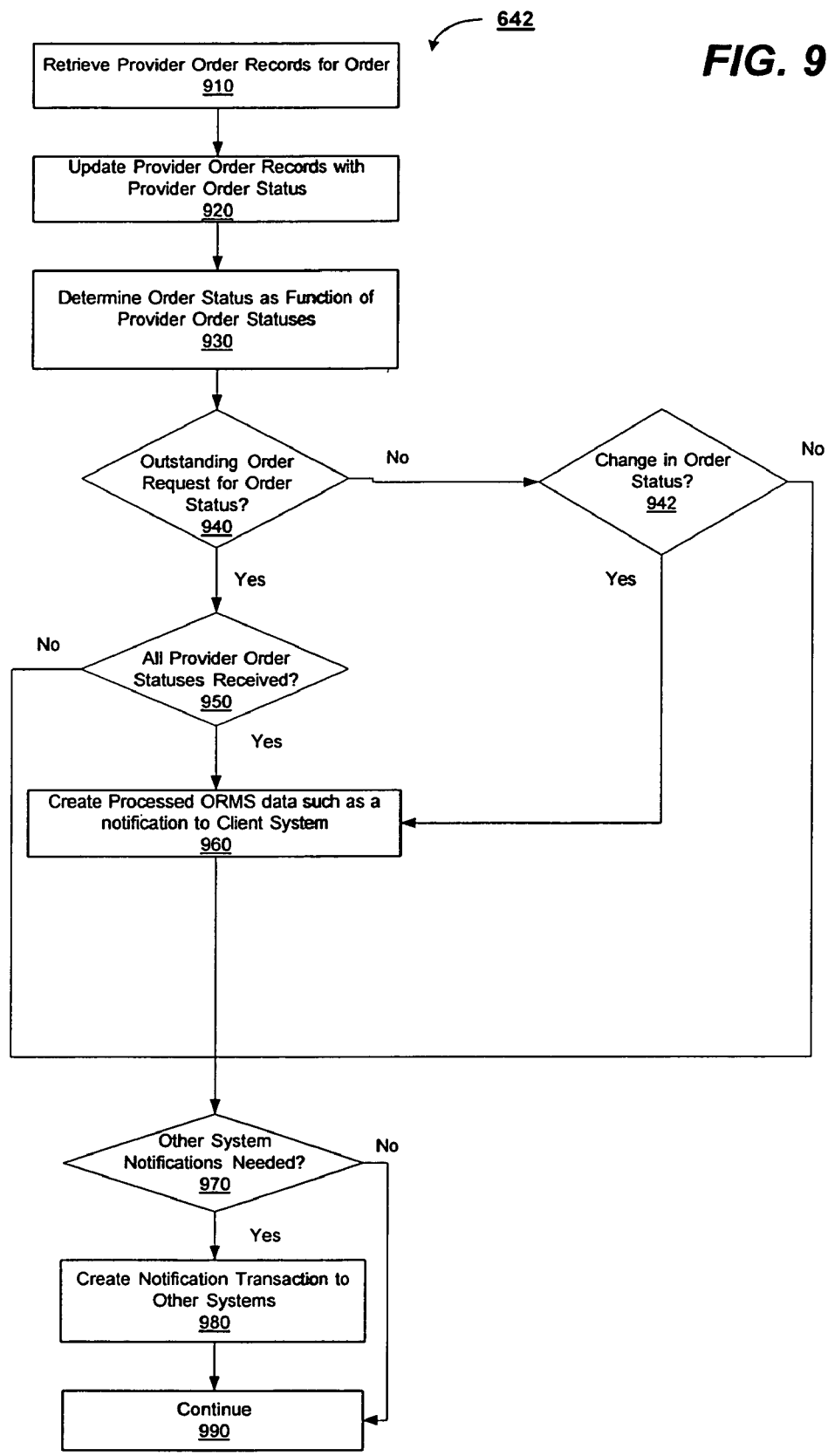
FIG. 9 shows a flowchart of the Analyze Provider Order Status step of FIG. 6.

FIG. 9 shows a flowchart of the Analyze Provider Order Status 642 step. The order request servicing system 110 has received a response in the form of a provider order status from an order request management system 120. A provider order status includes a response to the following types of order requests: an order request for order status from a customer, and a batch order request to update order status which is run periodically.

In step 910, the order request servicing system 110 retrieves from order database 322 the provider orders for which a provider order status has been received, in addition to all other provider order records for the related order. Order request servicing system 110 then proceeds to step 920 to update the corresponding provider order records with the provider order status received. Order request servicing system 110 then proceeds to step 930 to determine the order status for the order from the provider order records associated with the order. The provider order statuses for the provider orders making up the order are integrated to provide an overall order status.

In step 940, order request servicing system 110 determines whether the order has an outstanding order request for order status. If the order has an outstanding order request for order status, order request servicing system 110 proceeds to step 950. If the order does not have an outstanding order request for an order status, order request servicing system 110 proceeds to step 942.

In step 942, no order request for an order status is outstanding. If there is no change in order status, order request servicing system 110 does not notify the client of the receipt of the updated provider order status because the overall order status is unaffected. Rather, order request servicing system 110 proceeds to step 940 to determine if other system 202 notification transactions are needed.

In step 942, if there has been a change in order status, order request servicing system 110 proceeds to step 960.

Returning to step 940, if order request servicing system 110 has determined that an order request for order status is outstanding, order request servicing system 110 proceeds to step 950. In step 950, order request servicing system 110 determines whether all provider order statuses for the order have been received. If all provider order statuses for the order have not been received, the order request servicing system 110 proceeds to step 970 to wait for other provider order statuses to arrive. If all provider order statuses for the order have been received, the order request servicing system 110 proceeds to step 960.

In step 960, either an order request for order status was outstanding and all provider order status responses have been received, or an order request management system 120 has sent an updated provider order status that affects an overall order status. In step 960, the order request servicing system 110 creates an order request management system data notification transaction containing the order status to be sent to the client system 105.

In step 970, the order request servicing system 110 determines whether other system 202 notification transactions are needed in addition to the notification of the client system 105 of a changed or updated order status. If other system 202 notification transactions are needed, order request servicing system 110 proceeds to step 980 to create the notification transactions for the corresponding other systems 202. If other system 202 notification transactions are not needed in step 970, the order request servicing system 110 proceeds to step 990 to complete the analysis of the order request for order status.

In step 990, the order request servicing system 110 has completed step 642, the Analyze Provider Order Status step. The order request servicing system 110 has also completed module 520, the Analyze Order Request/Response and Create Necessary Transactions, and uses module 550 of FIG. 5, Send Transactions to Client System, to transmit the order status to the client systems 105.

While the invention has been described with respect to the embodiments and variations set forth above, these embodiments and variations are illustrative and the invention is not to be considered limited in scope to these embodiments and variations. For example, in another embodiment, the order request servicing system may be implemented in a software environment that does not use the object-oriented paradigm. Accordingly, various other embodiments and modifications and improvements not described herein may be within the spirit and scope of the present invention.

What is claimed is:

1. A transaction processing method for utilizing an order request servicing system for routing order requests to multiple order request management systems ("ORMSs") of fulfillment partners and integrating respective ORMS data from ORMSs of each fulfillment partner, the method for utilizing the order request servicing system comprising:

receiving with the order request servicing system an order request from a client system;

processing, by the order request servicing system, the received order request into multiple processed order requests;

selecting, by the order request servicing system, fulfillment partners for each of the processed order requests;

for each of the processed order requests, transmitting the processed order request to the ORMS of the selected fulfillment partner;

receiving from each of the ORMSs of the selected fulfillment partners ORMS data associated with the processed order request transmitted to the ORMS of the fulfillment partners; and integrating the received ORMS data from the ORMSs of the fulfillment partners.

2. The method of claim 1 wherein the order request includes placement of an order for one or more items, each item being selected from a group consisting of a good or a service.

3. The method of claim 1 wherein the order request includes multiple ordered items and processing the order request into multiple processed order requests further comprises:

splitting the order request into the multiple processed order requests wherein each processed order request includes at least one of the items.

4. The method of claim 1 wherein the order request includes multiple ordered items for a client and selecting fulfillment partners for each of the processed order requests further comprises:

using electronically stored routing rules to select a fulfillment partner from business relationships of the client to provide each item ordered.

5. The method of claim 1 wherein the order request includes multiple ordered items, the method further comprising:

generating a fulfillment plan which pairs each item in the order with a selected fulfillment partner.

6. The method of claim 1 wherein the order request is a request to view information related to orders including ORMS catalog information.

7. The method of claim 1 wherein the order request servicing system is a hub in an order servicing organization and the ORMS of a first of the fulfillment partners comprises a spoke in the order servicing organization and further comprises another order request servicing system, the method further comprising using the order request servicing system of the first fulfillment partner to:

(a) process the processed order request of the first fulfillment partner into multiple processed order requests;

(b) select fulfillment partners for each of the processed order requests in (a);

(c) for each of the processed order requests in (a), transmitting the processed order request to the ORMS of the selected fulfillment partner in (b);

(d) receive from each of the ORMSs of the fulfillment partners in (c) ORMS data associated with the processed order request transmitted to the ORMS of the fulfillment partners in (c); and (e) integrate the received ORMS data from the ORMSs of the fulfillment partners in (d).

8. The method of claim 1 wherein:

receiving an order request includes receiving the order request through a gateway, each gateway being selected from a group consisting of the following:
an electronic data interchange (EDI) gateway; and
an extensible markup language (XML) gateway;

transmitting each processed order request to one of the selected ORMSs includes using a communication link to the selected ORMS;

receiving respective ORMS data from each of the selected fulfillment partners includes receiving respective ORMS data via the communication link; and the communication link is selected from a group consisting of the following:
the Internet;
one or more direct communication links;
a satellite network;
a cellular network; and
a local data transport system.

9. The method of claim 1 wherein:

receiving respective ORMS data from each of the selected ORMSs includes at least one of the following:
receiving respective ORMS data from each of the selected fulfillment partners individually; and
receiving respective ORMS data from each of the selected fulfillment partners in a batch in response to a transaction transmitted from the order servicing system to each of the ORMSs of the selected fulfillment partners.

10. The method of claim 1 wherein receiving an order request includes receiving the order request from a client system.

11. The method of claim 10 wherein the client system includes at least one of the following:
a computer system with a client interface that is used by customers to place order requests;
the order request servicing system recursively calling itself; and
a first order request servicing system transmitting one or more processed order requests to an ORMS, the ORMS including a second order request servicing system.

12. The method of claim 1 wherein:

processing the received order request into multiple processed order requests comprises:
retrieving business relationship rules between a client and fulfillment partners;
retrieving business relationship data applicable to the business relationship rules; and
selecting fulfillment partners for each of the processed order requests comprises:
for each processed order request, selecting fulfillment partners in accordance with the business relationship rules and business relationship data.

13. The method of claim 1 further comprising:

determining an order status for the received order request from the received ORMS data associated with the processed order request.

14. The method of claim 1 wherein the client system is another order request servicing system.

15. An order servicing organization system for routing order requests to multiple order request management systems ("ORMSs") of fulfillment partners and integrating respective ORMS data from ORMSs of each fulfillment partner, the order servicing organization system comprising:

a first order request servicing system having an interface to receive an order request from a client system, having a memory storing business relationship information relating a client and the fulfillment partners, and having a processing engine to:

process the order request into multiple processed order requests;

select fulfillment partners for each of the processed order requests using the business relationship information;

for each of the processed order requests, transmit the processed order request to the ORMS of the selected fulfillment partner;

receive from each of the ORMSs of the selected fulfillment partners ORMS data associated with the processed order request transmitted to the ORMS of the fulfillment partners; and integrate the received ORMS data from the ORMSs of the fulfillment partners.

16. The order servicing organization system of claim 15 wherein the order request includes multiple ordered items for a client, and the first order request servicing system further comprises:

routing objects to access the business relationship information and select the fulfillment partners for each of the processed order requests.

17. The order servicing organization system of claim 15 further comprising:

a client system having a client interface; and a communication link between the client system and the first order request servicing system.

18. The order servicing organization system of claim 17 wherein the client interface is selected from a group comprising a kiosk, a web storefront, and an Internet terminal.

19. The order servicing organization system of claim 17 wherein the first order request servicing system is a hub in the order servicing system, the order servicing organization system further comprising:

N order request servicing systems which form order servicing system spokes from the first order request servicing system, each of the N order request servicing systems having an interface to receive a processed order request from the first order request servicing system, having a memory to store business relationship information, wherein N is a positive integer, the N order request servicing systems each further having a processing engine to:

(a) process the processed order request into multiple processed order requests;

(b) select fulfillment partners for each of the processed order requests in (a);

(c) for each of the processed order requests in (a), transmitting the processed order request to the ORMS of the selected fulfillment partner in (b);

(d) receive from each of the ORMSs of the fulfillment partners in (c) ORMS data associated with the processed order request transmitted to the ORMS of the fulfillment partners in (c); and (e) integrate the received ORMS data from the ORMSs of the fulfillment partners in (d).

20. The order servicing organization system of claim 17 wherein the order request includes an order for one or more items, each item being selected from a group consisting of a good or a service.

21. A transaction processing system having an order request servicing system for routing order requests to multiple order request management systems ("ORMSs") of fulfillment partners and integrating respective ORMS data from ORMSs of each fulfillment partner, the order request servicing system comprising:

means for receiving an order request from a client system;

means for processing the order request into multiple processed order requests;

means for selecting fulfillment partners for each of the processed order requests;

means for transmitting the processed order request to the ORMS of the selected fulfillment partner;

means for receiving from each of the ORMSs of the selected fulfillment partners ORMS data associated with the processed order request transmitted to the ORMS of the fulfillment partners; and means for integrating the received ORMS data from the ORMSs of the fulfillment partners.

22. The transaction processing system of claim 21, wherein the order request servicing system further comprises:

means for retrieving business relationship rules between a client and fulfillment partners;

means for retrieving business relationship data applicable to the business relationship rules; and for each processed order request, means for selecting fulfillment partners in accordance with the business relationship rules and business relationship data.

23. A program storage device readable by a machine, tangibly embodying a program of instructions executable by the machine to perform a method for utilizing an order request servicing system for routing order requests to multiple order request management systems ("ORMSs") of fulfillment partners and integrating respective ORMS data from ORMSs of each fulfillment partner, the method for utilizing an order request servicing system comprising:

receiving with the order request servicing system an order request from a client system;

processing, by the order request servicing system, the order request into multiple processed order requests;

selecting, by the order request servicing system, fulfillment partners for each of the processed order requests;

for each of the processed order requests, transmitting the processed order request to the ORMS of the selected fulfillment partner;

receiving from each of the ORMSs of the selected fulfillment partners ORMS data associated with the processed order request transmitted to the ORMS of the fulfillment partners; and integrating the received ORMS data from the ORMSs of the fulfillment partners.

24. The method of claim 23 wherein:

processing the received order request into multiple processed order requests comprises:

retrieving business relationship rules between a client and fulfillment partners;

retrieving business relationship data applicable to the business relationship rules; and selecting fulfillment partners for each of the processed order requests comprises:

for each processed order request, selecting fulfillment partners in accordance with the business relationship rules and business relationship data.

25. The method of claim 23 wherein the client system is an order request servicing system.

26. A system comprising:

a processor;

a memory coupled to the processor, the memory storing code that is executable by the processor for implementing an order request servicing system for routing order requests to multiple order request management systems ("ORMSs") of fulfillment partners and integrating respective ORMS data from ORMSs of each fulfillment partner, wherein the code implementing the order request servicing system includes code to:

receive an order request from a client system in electronic communication with the order request servicing system;

process the received order request into multiple processed order requests;

select fulfillment partners for each of the processed order requests;

for each of the processed order requests, transmit the processed order request to the ORMS of the selected fulfillment partner;

receive from each of the ORMSs of the selected fulfillment partners ORMS data associated with the processed order request transmitted to the ORMS of the fulfillment partners; and integrate the received ORMS data from the ORMSs of the fulfillment partners.

27. The system of claim 26 wherein:
to process the received order request into multiple processed order requests comprises:
retrieving business relationship rules between a client and fulfillment partners;
retrieving business relationship data applicable to the business relationship rules; and
to select fulfillment partners for each of the processed order requests comprises:
for each processed order request, selecting fulfillment partners in accordance with the business relationship rules and business relationship data.

* * * * *

(12) INTER PARTES REEXAMINATION CERTIFICATE (0312th)
United States Patent
Postelnik et al.

(10) Number: US 7,069,235 C1
(45) Certificate Issued: Oct. 25, 2011

(54) SYSTEM AND METHOD FOR MULTI-SOURCE TRANSACTION PROCESSING

(75) Inventors: Igor Postelnik, Austin, TX (US);
Jocelyn E. Goldfein, Austin, TX (US);
Phil G. Gilbert, Austin, TX (US)

(73) Assignee: Versata Computer Industry Solutions, Inc., Austin, TX (US)

Reexamination Request:
No. 95/001,047, May 30, 2008

Reexamination Certificate for:
Patent No.: 7,069,235
Issued: Jun. 27, 2006
Appl. No.: 09/518,766
Filed: Mar. 3, 2000

(51) Int. Cl.
*G06Q 30/00* (2006.01)

(52) U.S. Cl. .................... 705/26.81; 705/27.1
(58) Field of Classification Search .............. None
See application file for complete search history.

(56) References Cited

U.S. PATENT DOCUMENTS

| | | |
|---|---|---|
| 4,972,318 A | 11/1990 | Brown |
| 5,008,853 A | 4/1991 | Bly |
| 5,253,165 A | 10/1993 | Leiseca |
| 5,305,200 A | 4/1994 | Hartheimer |
| 5,319,542 A | 6/1994 | King, Jr. |
| 5,361,199 A | 11/1994 | Shoquist |
| 5,495,412 A | 2/1996 | Thiessen |
| 5,535,383 A | 7/1996 | Gower |
| 5,557,518 A | 9/1996 | Rosen |
| 5,629,982 A | 5/1997 | Micali |

(Continued)

FOREIGN PATENT DOCUMENTS

| | | |
|---|---|---|
| WO | WO 90-11572 | 10/1990 |
| WO | WO 96-12242 | 4/1996 |
| WO | WO 97-04410 | 2/1997 |
| WO | WO 97-13329 | 4/1997 |

OTHER PUBLICATIONS

Esther Shein, Back–End Transactions Are No Bargain, PCWeek, pp. 55, 60, 64, Aug. 24, 1998.

(Continued)

*Primary Examiner* — Peter C. English

(57) ABSTRACT

A system and method for multi-source transaction processing receives order requests from a client system operated by a user. The order requests may include order placements and order inquiries. For example, an order request may be a placement for a computer system and associated peripherals. The user may have particular fulfillment organization preferences, and different components of the computer system and associated peripherals may be fulfilled by different fulfillment partners. Accordingly, the orders order requests are processed by an order request servicing system to, for example, split the order request into multiple processed order requests and each of the processed order requests is associated with an order request management system and prepared for transmission to the associated order request management system. The order request management systems can utilize the processed order requests to fulfill the order request. The order request management systems transmit order request management system data which provides, for example, order status information, financial information, and other data. The order request servicing system may, for example, internally process the order request management system data associated with an order request, transmit the order request management system data to the client system, or transmit the order request management system data to another system depending upon the nature of the order request management system data. Thus, the order request servicing system can transparently link users to one or more order request management systems. Additionally, the order request management systems can be linked together over a network, such as the Internet, to provide a network of order request management systems.

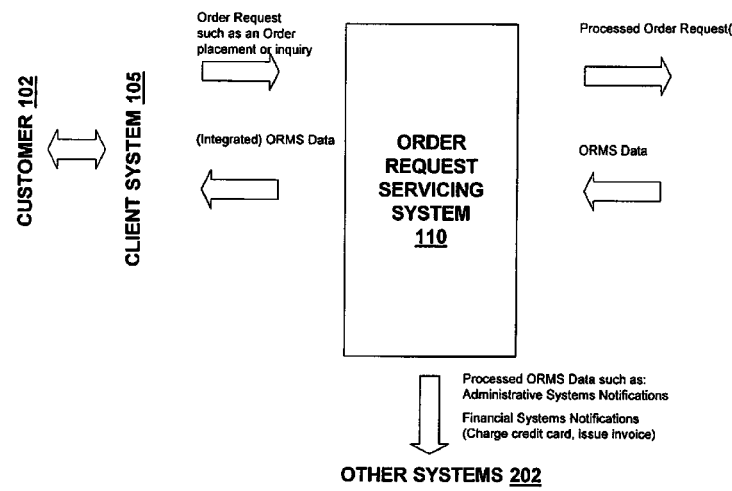

U.S. PATENT DOCUMENTS

| | | |
|---|---|---|
| 5,664,115 A | 9/1997 | Fraser |
| 5,666,420 A | 9/1997 | Micali |
| 5,666,493 A | 9/1997 | Wojcik |
| 5,668,953 A | 9/1997 | Sloo |
| 5,671,279 A | 9/1997 | Elgamal |
| 5,677,955 A | 10/1997 | Doggett |
| 5,692,206 A | 11/1997 | Shirley |
| 5,694,551 A | 12/1997 | Doyle |
| 5,712,989 A | 1/1998 | Johnson |
| 5,715,314 A | 2/1998 | Payne |
| 5,715,402 A | 2/1998 | Popolo |
| 5,721,832 A | 2/1998 | Westrope |
| 5,732,400 A | 3/1998 | Mandler |
| 5,734,719 A | 3/1998 | Tsevdos |
| 5,757,917 A | 5/1998 | Rose |
| 5,758,126 A | 5/1998 | Daniels |
| 5,758,327 A | 5/1998 | Gardner |
| 5,778,355 A | 7/1998 | Boyer |
| 5,787,262 A | 7/1998 | Shakib |
| 5,787,402 A | 7/1998 | Potter |
| 5,790,677 A | 8/1998 | Fox |
| 5,794,006 A | 8/1998 | Sanderman |
| 5,794,207 A | 8/1998 | Walker |
| 5,794,212 A | 8/1998 | Mistr |
| 5,799,151 A | 8/1998 | Hoffer |
| 5,799,289 A | 8/1998 | Fukushima |
| 5,802,497 A | 9/1998 | Manasse |
| 5,809,144 A | 9/1998 | Sirbu |
| 5,815,665 A | 9/1998 | Teper |
| 5,826,242 A | 10/1998 | Montulli |
| 5,826,244 A | 10/1998 | Huberman |
| 5,870,717 A | 2/1999 | Wiecha |
| 5,873,071 A | 2/1999 | Ferstenberg |
| 5,893,075 A | 4/1999 | Plainfield |
| 5,897,621 A | 4/1999 | Boesch |
| 5,905,975 A | 5/1999 | Ausubel |
| 5,918,218 A | 6/1999 | Harris |
| 5,941,947 A | 8/1999 | Brown |
| 5,945,989 A | 8/1999 | Freishtat |
| 5,950,177 A | 9/1999 | Lupien |
| 5,961,601 A | 10/1999 | Iyengar |
| 5,963,923 A | 10/1999 | Garber |
| 5,970,475 A | 10/1999 | Barnes |
| 5,983,194 A | 11/1999 | Hogge |
| 5,996,076 A | 11/1999 | Rowney |
| 6,014,643 A | 1/2000 | Minton |
| 6,023,683 A | 2/2000 | Johnson |
| 6,035,288 A | 3/2000 | Solomon |
| 6,067,528 A | 5/2000 | Breed |
| 6,067,531 A | 5/2000 | Hoyt |
| 6,085,169 A | 7/2000 | Walker |
| 6,085,178 A | 7/2000 | Bigus |
| 6,112,189 A | 8/2000 | Rickard |
| 6,125,391 A | 9/2000 | Meltzer |
| 6,151,588 A | 11/2000 | Tozzoli |
| 6,167,378 A | 12/2000 | Webber |
| 6,182,055 B1 | 1/2001 | Kase |
| 6,192,034 B1 | 2/2001 | Hsieh |
| 6,195,646 B1 | 2/2001 | Grosh |
| 6,226,675 B1 | 5/2001 | Meltzer |
| 6,236,984 B1 | 5/2001 | Owens |
| 6,259,700 B1 | 7/2001 | Hsieh |
| 6,263,317 B1 | 7/2001 | Sharp |
| 6,332,129 B1 | 12/2001 | Walker |
| 6,356,878 B1 | 3/2002 | Walker |
| 6,401,080 B1 | 6/2002 | Bigus |
| 6,418,415 B1 | 7/2002 | Walker |
| 6,466,919 B1 | 10/2002 | Walker |
| 6,510,418 B1 | 1/2003 | Case |
| 6,542,912 B2 | 4/2003 | Meltzer |
| 6,553,346 B1 | 4/2003 | Walker |
| 6,587,827 B1 | 7/2003 | Hennig |
| 6,606,603 B1 | 8/2003 | Joseph |
| 6,669,832 B1 | 12/2003 | Saito |
| 6,901,430 B1 | 5/2005 | Smith |
| 6,928,411 B1 | 8/2005 | Fox |
| 6,963,847 B1 | 11/2005 | Kennedy et al. |
| 6,980,963 B1 | 12/2005 | Hanzek |
| 7,117,165 B1 | 10/2006 | Adams |

OTHER PUBLICATIONS

R/3 Demos and Data–Materials Management, Feb. 17, 1993, SAP.
MM System–Inventory Controlling, Nov. 1, 1993, SAP.
FI GLX–Basic Functions, Jul. 1, 1994, SAP.
RK System–Screen Procedures; Job Order Settlement, Jan. 1, 1992, SAP.
RM System–Course RM 001 Overview, Jul. 1, 1992, SAP.
RM–MAT System–Table of Contents, Jul. 1, 1992, SAP.
RM System–Capacity Planning, Jan. 1, 1992, SAP.
RM System–Production Orders, May 1, 1992, SAP.
RB, RF, RA, RK® Description of Development, May 1, 1991, SAP.
RS System–Introduction to EDI Jan. 1, 1991, SAP.
RM System 4.3—M 04.2 Screen Procedures (vol. 5)® Material Requirement Planning, Jan. 1, 1988, SAP.
RM System–Screen Procedures;® Production Orders, May 1, 1992, SAP.
RV System–RV Integration® into the R/2 System, Oct. 1, 1990, SAP.
RV System–Individual Customer Orders, May 1, 1992, SAP.
RM System–Screen Procedures;® IS–Oil Part 1, May 1, 1994, SAP.
RM System–Screen Procedures;® Valuation, Jul. 1, 1992, SAP.
RV System–RV Integration into the R/2 System, Oct. 1, 1990, SAP.
RV System–Transportation; Modifications, May 1, 1992, SAP.
RK System–Product Cost® Accounting for Stock Production, Mar. 1, 1992, SAP.
RK System–Process Costing, Jan. 1, 1991, SAP.
RK System, Release 4.3, Jan. 1, 1989, SAP.
RV System–Individual Customer Orders, Jan. 1, 1990, SAP.
RV System–Order Processing, May 1, 1991, SAP.
RM System–Screen Procedures;® MaterialRequirements Planning, Feb. 1, 1993, SAP.
RM System–Screen Procedures;® Production Orders, Dec. 1, 1989, SAP.
RM System–Screen Procedures;® Technical Objects, Apr. 1, 1992, SAP.
Improving corporate profits with inventory management: Part I: Planning to meet future needs, Feb. 1, 1981, Purchasing World.
Pinkerton on PCs: CAP gives PMs power, Sep. 1, 1987, Purchasing World.
Communications Oriented Production Information & Control System, vol. II, Mar. 1, 1972, IBM.
Communications Oriented Production Information & Control System, vol. VII, Mar. 1, 1972, IBM.
GE Supply Offers Ordering Software, Apr. 15, 1993, Purchasing.
Buyers' Guide to Software For Purchasing, Oct. 21, 1993, Purchasing.

Buyers' Guide to EDI Software For Purchasing, Nov. 11, 1993, Purchasing.

Software Buyers' Guide, May 1, 1994, Purchasing.

COPICS: Purchasing with EDI User Guide, Jan. 1, 1991, IBM.

Produrement Functions General Information Manual, Jan. 1, 1994, SynNova.

Material Scheduling Functions® General Information Manual, Jan. 1, 1994, SynNova.

CIM Advantage: Introducing SAA CustomerOrderManager/370, Jan. 1, 1991, IBM.

CIM Advantage: Introducing SAA PurchasingManager/370, Jan. 1, 1991, IBM.

ASAP Link Reference Manual, Baxter Healthcare Corporation, Oct. 1987.

Trilogy Enters Crowded High–End Sell–Side E–Commerce Software Market with Multichannel Commerce 2.0, Idea Byte, Oct. 12, 1999.

Purchasing, Mar. 1994, R/3.

Purchase SQL. The Most Complete Purchasing and Requisition Management System, Purchase SQL, 1995 or earlier.

Purchasing tools for the Internet toolbox, Dec. 11, 1997, Carbone.

Developing Internet–Enabled Supply Chain Strategies, Sep. 4, 1998, Enslow; Smith.

Anna–Lena Neches, "Fast—A Research Project in Electronic Commerce," EM –Electronic Markets, Oct. 1993.

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1-6, 8-18, 20 and 23-27 is confirmed.

Claims 7, 19, 21 and 22 were not reexamined.

\* \* \* \* \*